(12) United States Patent
Abo et al.

(10) Patent No.: US 6,748,919 B2
(45) Date of Patent: Jun. 15, 2004

(54) INTERNAL COMBUSTION ENGINE AND FUEL INJECTION CONTROL DEVICE THEREFOR

(75) Inventors: Matsuharu Abo, Hitachinaka (JP); Yoshiyuki Tanabe, Hitachinaka (JP); Hiroshi Fujii, Tokyo (JP); Koji Onishi, Hitachinaka (JP); Toshio Ishii, Mito (JP); Mamoru Fujieda, Tomobe-machi (JP)

(73) Assignee: Hitachi, Ltd., Tokyo (JP)

( * ) Notice: Subject to any disclaimer, the term of this patent is extended or adjusted under 35 U.S.C. 154(b) by 263 days.

(21) Appl. No.: 10/041,606

(22) Filed: Jan. 10, 2002

(65) Prior Publication Data

US 2002/0088428 A1 Jul. 11, 2002

(30) Foreign Application Priority Data

Jan. 10, 2001 (JP) .................................. 2001-002044

(51) Int. Cl.⁷ ................................................. F02B 3/00
(52) U.S. Cl. ........................ 123/299; 123/305; 123/704; 123/559.1
(58) Field of Search ................................ 123/299, 305, 123/304, 704, 559.1, 575

(56) References Cited

FOREIGN PATENT DOCUMENTS

JP        2000-54894        2/2000

*Primary Examiner*—Bibhu Mohanty
(74) *Attorney, Agent, or Firm*—Crowell & Moring LLP

(57) ABSTRACT

In the fuel cylinder injection engine with the supercharging machine, the ignitability deteriorates because the density of the fuel at the spray center becomes excessive due to the shrinkage of the fuel spray under the supercharging. As a result, the density of the smoke and the hydrocarbon exhaust rate increase.

The mixture of the fuel and the air under the supercharging is promoted by the control by TCV installed in the suction port which is a divided spray and air flow generation mechanism and the valve timing control of the suction and exhaust valve, etc.

10 Claims, 20 Drawing Sheets

FIG. 10
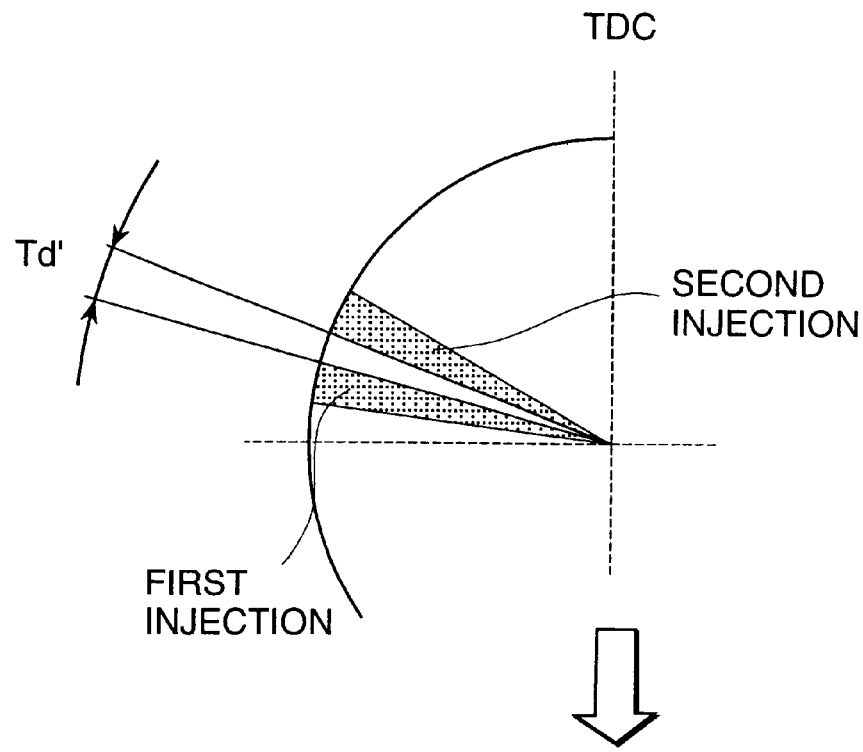
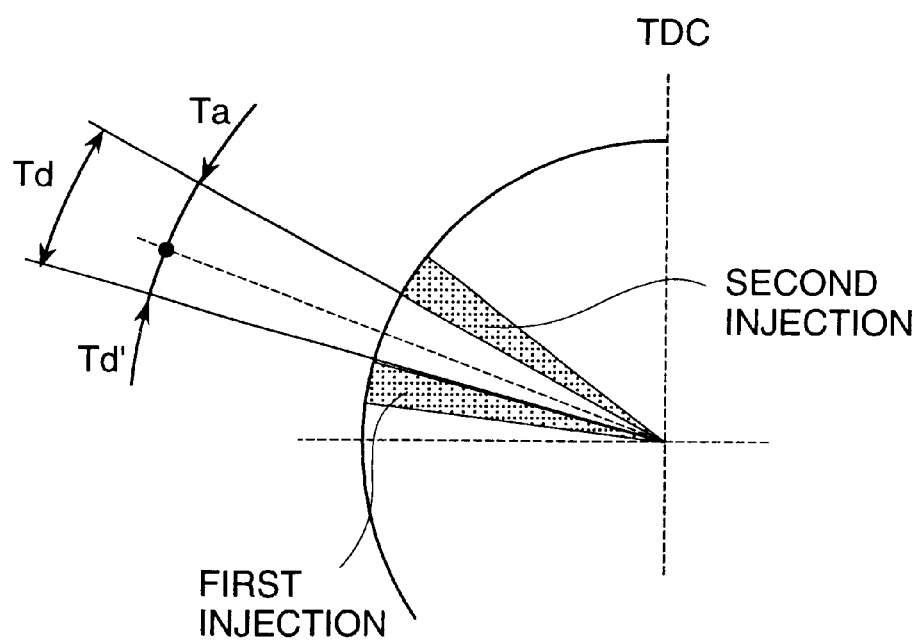

FIG. 11
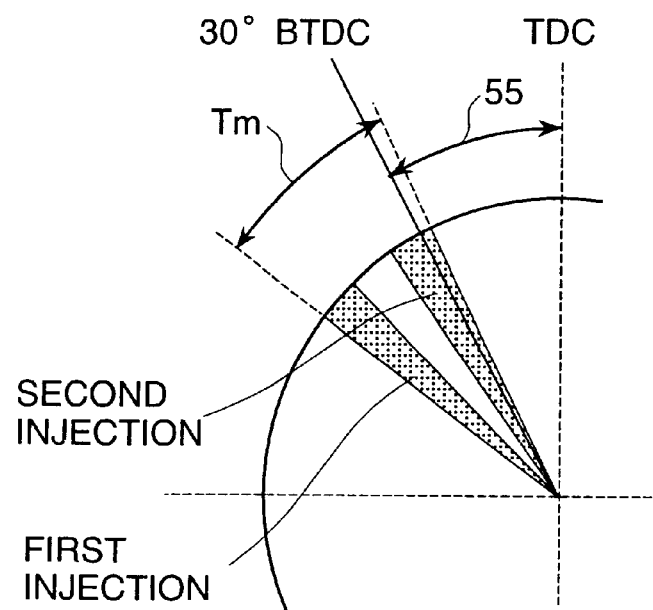
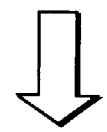
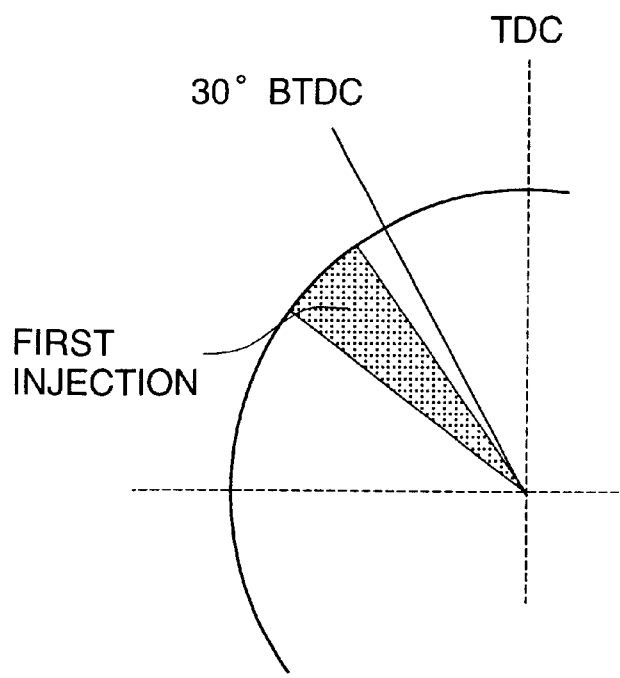

AA SECTION

PISTON SIDE ← → IGNITION PLUG SIDE
DEFLECTION SIDE

PISTON SIDE ← → IGNITION PLUG SIDE
DEFLECTION SIDE

AA SECTION

INTERNAL COMBUSTION ENGINE AND FUEL INJECTION CONTROL DEVICE THEREFOR

BACKGROUND OF THE INVENTION

The present invention relates to a fuel injection control device for an internal combustion engine. The present invention relates especially to a fuel injection control device for an internal combustion engine of a so-called fuel cylinder injection type which injects the fuel directly to the combustion chamber. More concretely, the present invention relates also to a fuel cylinder injection engine with a the supercharging machine.

The fuel cylinder injection engine with the supercharging machine is disclose in the Japanese Patent Application Laid-Open No. 2000-54894. In the fuel injection control device of this prior art, the fuel spray is divided within the range of the ignition time and the intake stroke when the acceleration is detected, and the fuel injection timing in the later term is set after the middle term of the compression stroke. The combustion gas is supplied to the exhaust side at shorter time after ignition, and high energy is given to the turbine of the turbocharger by making like this. Namely, the response of the turbocharger is improved.

However, it has been understood that the fuel spray is crushed by the pressure of the combustion chamber when the fuel spray is injected to the combustion chamber where pressure was improved by the supercharging machine, the fuel distribution in the center part of the fuel spray rises (in a word, the fuel spray concentrates on a specific part), and there is a tendency that the ignitability of the fuel deteriorates in the technology described in the above-mentioned Japanese Patent Application No. 2000-54894.

Moreover, the fuel is divided into the previous term and the later term of the compression stroke in the middle term of acceleration between the previous term of acceleration of the engine and the later term and injected in the above-mentioned prior art.

However, the total injection time of the fuel injection can do nothing but shorten because the time allowed for the fuel injection in the compression stroke shortens when the engine is comparatively in high loaded condition. Therefore, the problem that the injection in the previous term and the injection in the later term becomes close and the effect of divided injection is lost occurs.

Here, on the assumption of the slow acceleration in the stratification drive area where the previous term injection and the later term injection are continuously occurred (For instance, in the vicinity of 1 ms at the injection interval between the previous term injection and the later term injection), the driving current decreases due to shortage of the charging time of the voltage applied to the fuel injection valve, and injection amount on the later term side might decrease consequentially. The air/fuel ratio becomes lean when the injection amount decreases, and the accidental fire might occur.

Moreover, the power supply line voltage changes, because the electric load always changes by the drive of the auxiliary machine etc. Therefore, it is necessary to detect the change of the power supply line voltage, and to make the exhaust and the operability not influence.

SUMMARY OF THE INVENTION

An object of the present invention is to cancel at least one of the above-mentioned problems.

An object of a certain invention is to decrease the exhaust rate of the smoke and the hydrocarbon by preventing the fuel spray from concentrating on a specific part.

Moreover, an object of another invention is to provide a fuel control device suitable for the fuel cylinder injection type engine with the supercharging machine.

In addition, an object of another invention is to expand the stratification drive area by devising the control of the fuel injection valve to do the stable divided injection, and, as a result, to achieve the decrease of the fuel consumption.

It is effective to the fuel cylinder injection engine without the supercharging machine though the present invention is suitable for the fuel cylinder injection type engine with the supercharging machine.

Therefore, the supercharging machine is especially added to the component parts in the invention suitable for the fuel cylinder injection type engine with the supercharging machine.

To solve at least one of the above-mentioned problems, the first invention relates to the internal combustion engine with the supercharging machine where the fuel injection valve for injecting the fuel directly to the combustion chamber is installed. A fuel density control means by which the fuel density of the mixture of the fuel and the air around the sparking plug at the ignition timing under supercharging is controlled to become a suitable density for the ignition is provided in this invention. The center part density of the fuel spray can be prevented from becoming excessive under the supercharging, and the air/fuel ratio around the sparking plug is prevented from becoming excessive according to this configuration. Therefore, the ignitability of the internal combustion engine with the supercharging machine is improved, and the decrease of the amount of the exhaust of the smoke and the unburnt fuel becomes possible.

Concretely, the fuel density control means sprays by dividing an amount of the fuel necessary for one combustion under the supercharging into two times before the timing of the ignition of the sparking plug.

Or, the basic spray form is a cone form, and the slit part where the fuel density is small, for balancing the pressure of the inside and the outside of the cone is formed in the cone spray.

Moreover, at least one of the spray allotment rate and the spray intervals of the divided spray can be adjusted according to the operating state of an engine, for instance, the magnitude of the voltage of the battery.

The second invention relates to the internal combustion engine with the supercharging machine where the fuel injection valve for injecting the fuel directly to the combustion chamber is installed. The fuel density control means by which the fuel density of the mixture of the fuel and the air around the sparking plug at the ignition timing under supercharging is controlled to become a suitable density for the ignition is provided in this invention. Further, the control valve mechanism which supplies the exhaust only to the catalyst by bypassing the exhaust turbocharger for driving the supercharging machine when the engine is started is installed. It is possible to activate the catalyst at the early stage, and to prevent from discharging the more harmful exhaust thing according to this configuration.

To solve at least one above-mentioned problems, the third invention provides with a supercharging machine, a fuel injection valve installed in the combustion chamber, for injecting directly fuel, and a mixture promotion device of the fuel and the air. This mixture promotion device is driven before and after the beginning of fuel injection. The center part density of the fuel spray can be prevented from becoming excessive according to this configuration. The air/fuel ratio around the sparking plug can be prevented from becoming excessive. As a result, the ignitability is improved, and the decrease of the amount of the exhaust of the smoke and the unburnt fuel becomes possible.

It is more effective that an air flow generation mechanism for generating the tumble air flow and/or the swirl one in the cylinder is provided in addition to the third invention. The mixture of the fuel and the air in the cylinder can be effectively done by using the air flow generated at the intake stroke according to this configuration.

In addition, it is effective that the air flow generation mechanism and the divided injection are used together.

To solve at least one of the above-mentioned problems, the fuel injection is controlled to inject the divided fuel two times or more between the intake stroke and the compression stroke, and injection amount (the injection time, the injection pulse width and the fuel pressure) is controlled based on the voltage fluctuation, in the fourth invention.
The touch area to the air of the fuel spray expands by dividing the fuel injection compared with the batch inject, and there is an effect advanced by the mixture of the fuel and the air according to the above-mentioned configuration. In addition, even if the voltage fluctuation is generated between the previous injection and the later injection, the torque change due to the instability of the combustion and the accidental fire due to the decrease of the injection amount can be prevented.

In addition, the frequency of divided injection is decreased or the injection interval is extended when the voltage drop is detected during divided injection. The combustion stability can be maintained by preventing the accidental fire even if the voltage drop is generated while executing divided injection according to this configuration.

To solve at least one of the above-mentioned problems, the fuel spray amount necessary at the cycle of one combustion is injected in twice between the compression stroke and the intake stroke, and the fuel injection valve is driven by substantially the same voltage as the power supply line voltage, in the fifth invention. Because the booster circuit becomes unnecessary, power consumption in the entire electronic equipment of the fuel injection control system can be decreased according to this configuration.

Because at least one of the above-mentioned problems is solved, the fuel spray amount necessary for one combustion is injected in twice between the compression stroke and the intake stroke in the fuel cylinder injection engine with the supercharging machine of the sixth invention. The fuel cylinder injection engine with the supercharging machine which can spark-advance the ignition timing as well as a fuel cylinder injection engine of the natural suction type under the supercharging can be achieved according to this configuration.

Moreover, with regard to the interval between the previous injection and the later injection in the divided injection, the time necessary to charge the coil of the fuel injection valve in the later injection with energy by setting the minimum injection interval. The accidental fire and the torque change due to the decrease in the amount of fuel injection can be prevented according to this configuration.

To solve at least one of the above-mentioned problems, it is also possible to provide the mechanism in which the fuel and the air are premixed, and the mixture is injected in the cylinder as an example of the application of the third invention in the sixth invention.

At this time, the compression natural gas can be used as the mixture means. Only the inject of the fuel or the compression natural gas can become possible according to this configuration. Therefore, the engine with the two or more fuel systems which can use both the liquid fuel and the gaseous fuel can be provided.

It is possible to perform the stratification operation to the higher engine speed by using the injection valve having the spray with a long spray travel, in a word, strong penetration (the long penetration spray) as an spray form of the fuel injection valve used for the spray control device of the third invention.

Moreover, to solve at least one of the above-mentioned problems, an eighth invention is provided with a mechanism for making the time of opening and shutting of suction and exhaust valve changeable, and a means for introducing the combustion gas from the exhaust port to the combustion chamber (thereafter, call internal EGR), and generating a weak swirl stream in the cylinder besides the air flow supplied from the suction port. It is effective to generate the gas flow in which the combustion gas flows along the cylinder wall by said weak swirl stream Concretely, the opening and shutting time changeable control of suction and exhaust valve spark-advances the close time in the one side of the exhaust valve, spark-delays the open time of the exhaust valve and an suction valve in the diagonal direction, and provides the phase difference at right and left opening and shutting valve time of the suction and exhaust valve. As a result, the swirl stream is generated.

Moreover, the phase difference is given in advance to the right and the left valves to shift smoothly from the high revolution drive area to the low revolution drive area.

In addition, the valve overlap is controlled by an opening and shutting time changeable control of suction and exhaust valve, and the opening and shutting valve time changeable control of two stages is executed, in which the opening and shutting valve time of the suction valve in one side is made changeable as the first stage, and the valve lift of the exhaust valve is increased as the second stage when the internal EGR is increased next.

In addition, it is effective that the swirl guide part is installed on the piston crown face as a means for generating the gas flow along the cylinder wall.

BRIEF DESCRIPTION OF DRAWINGS

FIG. 10 is a view showing the crank angle in the control method of the voltage drop detection.

FIG. 11 is a view showing the crank angle in a different control method of the voltage drop detection.

DESCRIPTION OF THE PREFERRED EMBODIMENTS

The embodiment of the present invention is explained by using the drawings. The fuel cylinder injection engine with the turbocharger according to an embodiment of the present invention is shown in FIG. 1 and FIG. 2.

Figure 1:
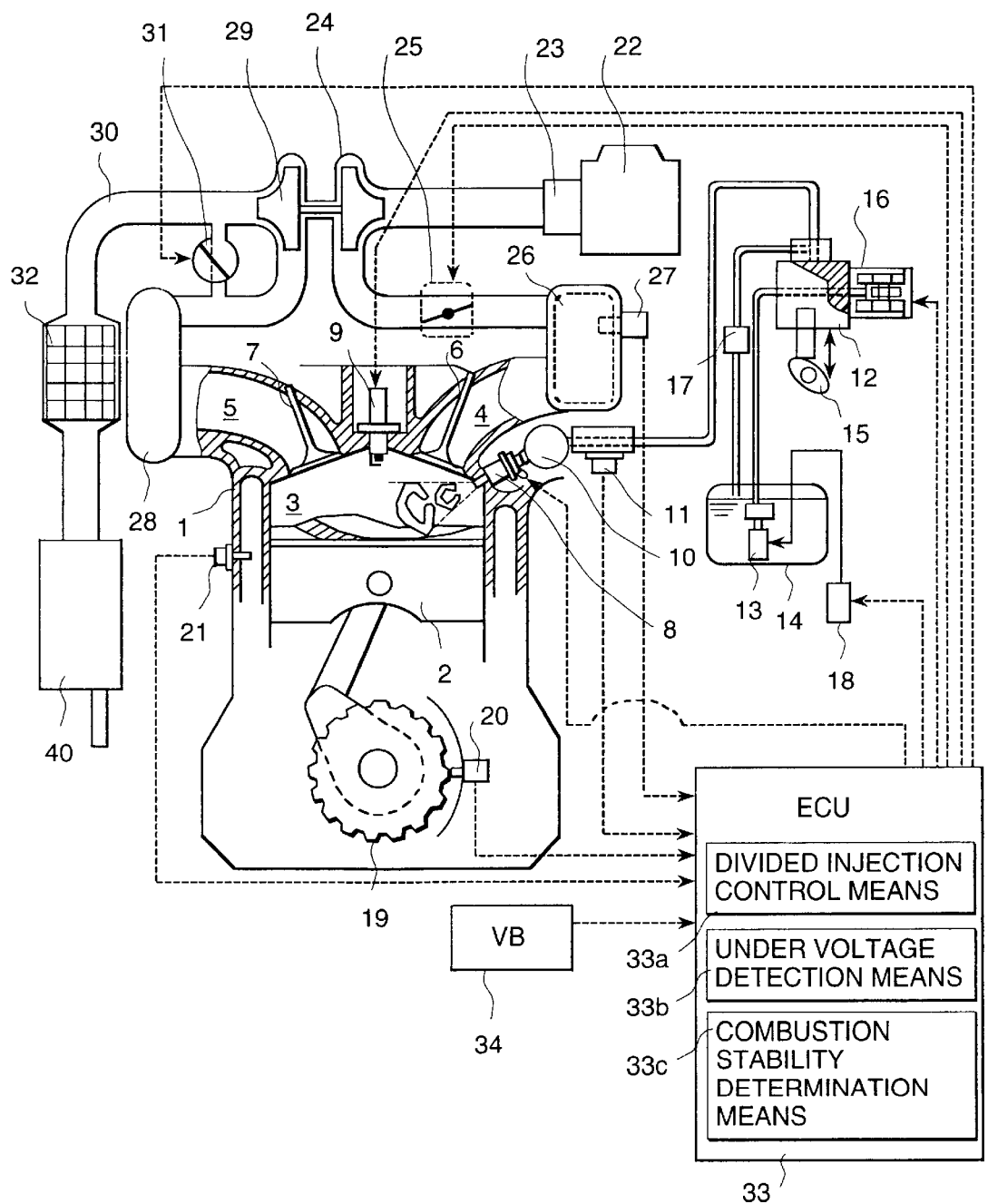
FIG. 1 is the configuration of one embodiment of the fuel cylinder injection engine with the supercharging machine.
Figure 2:
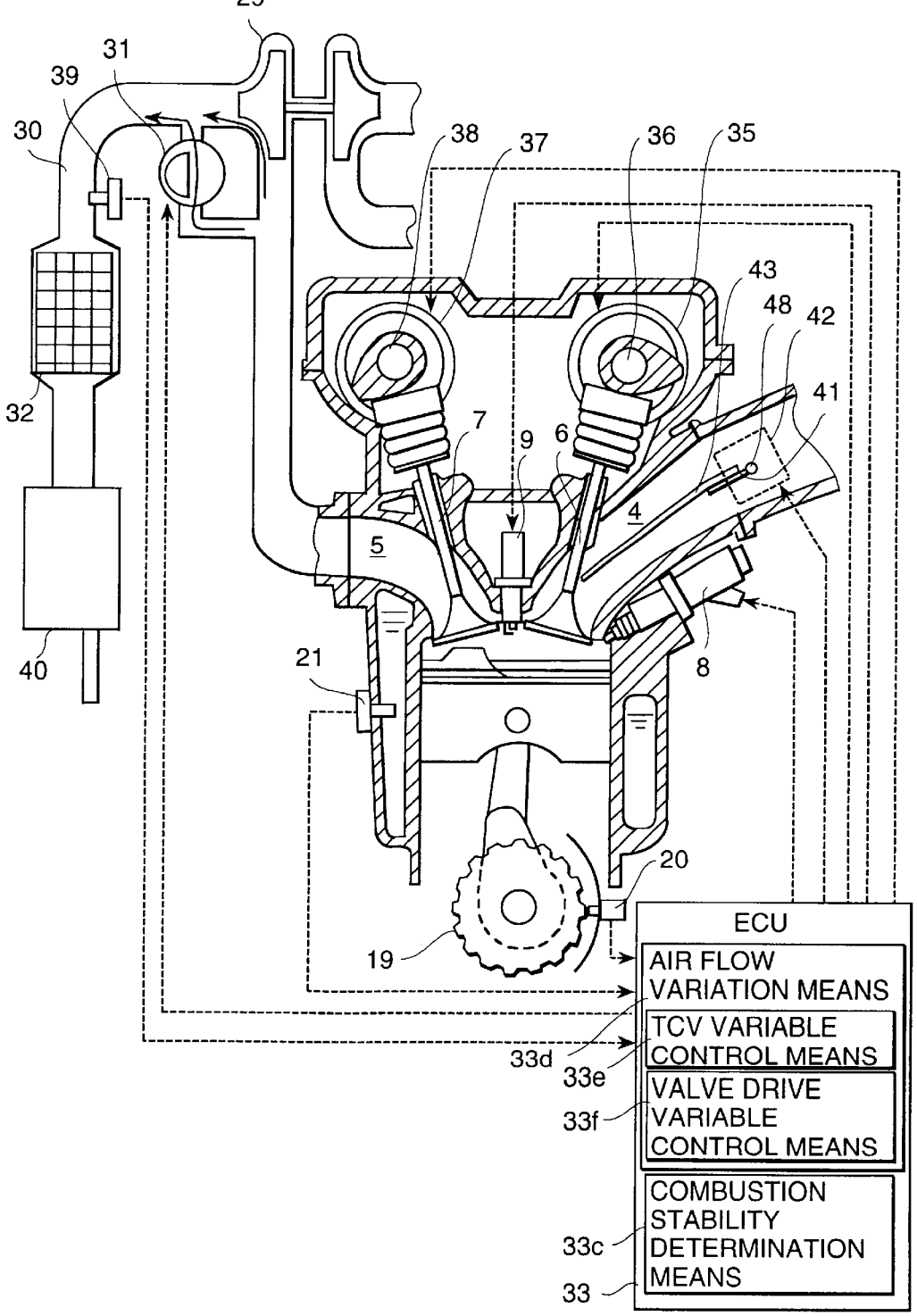
FIG. 2 is the configuration of a different embodiment of a fuel cylinder injection engine with the supercharging machine.

FIG. 1 shows one embodiment of the configuration of the engine. Moreover, FIG. 2 is an embodiment of a different configuration. The configuration of the entire engine is described by using FIG. 1 first.

Combustion chamber 3 is formed with a cylinder block and a cylinder head which forms engine 1, piston 2 inserted in the cylinder block, as for the fuel cylinder injection engine with the above-mentioned turbocharger, and plural cylinders are installed.

Two suction ports 4 and two exhaust ports 5 open to combustion chamber 3 which is one cylinder, and two suction valves 6 and two exhaust valves 7 which open and shut the opening is provided. Fuel injection valve 8 is installed between suction valves 6 and on the suction sidewall of combustion chamber 3, and sparking plug 9 is installed in the upper part of the combustion chamber.

the fuel distribution pipe 10, the fuel pressure sensor 11, high-pressure pump 12 which feeds the fuel forcefully, low-pressure pump 13, and fuel tank 14 are connected by the fuel piping in the upstream of fuel injection valve 8 respectively, to enable the fuel injection by fuel injection valve 8 even if the pressure in combustion chamber 3 is in a high state. High-pressure pump 12 is driven by cam 15 which synchronizes with the rotation of the camshaft (not shown) of the engine, raises the fuel pressure, and the fuel regulated to the fixed fuel pressure by high-pressure regulator 16 is supplied to fuel distribution pipe 10.

The surplus fuel not consumed by the engine is returned to fuel tank 14 after decompressed through low-pressure regulator 17. Low-pressure pump 13 is driven by low-pressure pump relay 18 from when the engine key was turned on at start, and starts to pressurize the pressure of the fuel supplied to high-pressure pump 12 in preparation for the fuel injection thereafter.

Rotation sensor 20 which detects the rotational fluctuation of ring gear 19 which rotates in synchronization with the crank shaft of the engine is installed at a suitable position of the engine crankcase. Water temperature sensor 21 which is one of the temperature detection means is installed at a suitable position of the cooling water passage of the cylinder block to determine the state of the warm up of the engine.

Air cleaner 22, air flow rate sensor 23, compressor 24 of the turbocharger, electronically controlled throttle body 25 driven by the motor is sequentially connected to the above-mentioned suction port 4 via intake pipe 26. Pressure sensor 27 for measuring the pressure in the suction passage is installed within intake pipe 26.

In the downstream of exhaust port 5, exhaust pipe 30 is provided through turbine 29 of the turbocharger connected to exhaust manifold 28. Exhaust manifold 28 and exhaust duct 30 are connected by bypass valve 31 which bypasses turbine 29 of the turbocharger, and the area of the opening of the by-pass passage is made changeable by the rotary valve driven by the motor.

Catalytic converter 32 and silencer 40 are set in the downstream of exhaust duct 30.

Here, it is possible to install exhaust gas temperature sensor 39 which measures the exhaust gas temperature in a suitable position in exhaust passage 30 between bypass valve 31 and catalytic converter 32 as shown in FIG. 2.

Next, air flow changeability means 33d is explained by using FIG. 2 showing a different embodiment.

Control unit 33 (Hereafter, it is referred as an ECU) has TCV changeable control means 33e for controlling the angle of the valve of tumble control valve 41 (Hereafter, it is referred as a TCV) which configures air flow changeability means 33d, and valve drive-changeable control means 33f for controlling a valve changeable actuator.

Said TCV changeable control means 33e controls the opening of TCV 41 installed in the suction passage faced suction port 4 by driving TCV actuator 42 by the motor or the diaphragm actuator,.

Moreover, partition 43 which divides the suction port into two is provided to suction port 4. The strength of the air flow generated in the cylinder or the tumble stream can be chiefly controlled by changeable controlling the opening of TCV 41 by using the above-mentioned configuration.

Next, valve drive-changeable control means 33f controls the air flow from suction port 4 to exhaust port 5 by controlling the valve-open operation of suction valve 6 and exhaust valve 7.

Here, suction valve 6 is connected to be driven by intake cam shaft 36 the rocker arm or the lifter with. To changeable control the valve open time of suction valve 6, intake cam shaft 36 is connected to suction valve changeable actuator 35. Here, the valve changeable actuator is provided with a valve timing changeable mechanism of the switch of the cam mountain or cam shaft etc. so that the operation angle of the cam of the intake cam shaft is changed though a valve changeable actuator is not explained in detail.

Similarly, exhaust valve 7 is connected to exhaust valve changeable actuator 37 through exhaust cam shaft 38.

Air flow changeability means 33d according to the above-mentioned configuration drives various actuators to set the most suitable set point suitable for the engine operating condition by executing the above-mentioned TCV changeable control means 33e and/or valve drive-changeable control means 33f.

Next, the control system of this embodiment is explained by using FIG. 1 and FIG. 2.

Output signals of various sensors mentioned above such as rotation sensor 20, water temperature sensor 21, and pressure sensor 27 are input to ECU 33. It is judged whether the engine is in the state of the cold engine or in the state of the warm up, and whether a homogeneous drive or the stratification drive is possible by determining the engine speed and the engine load.

Various programs such as the fuel injection program, the rotational fluctuation detection program, and the divided injection control program, etc. programmed in ECU 33 are executed when the stratification drive is possible, and drive signals are output to various actuators such as above-mentioned fuel injection valve 8, suction valve changeable actuator 35, and exhaust valve changeable actuator 37.

For instance, divided injection control means 33a refers to the injection amount allotment rate of the first injection and the second injection of the fuel injected in the cylinder in parts, fuel injection timing, and the injection interval, etc. from the control map and control table according to the internal pressure of the intake pipe detected by pressure sensor 27 and the fuel pressure detected by fuel pressure sensor 11.

Voltage detection means 33b always observes the voltage fluctuation of power supply voltage 34 during the stratification operation.

Next, divided injection control means 33a continues the divided injection control only when judged that the second inject can be executed without trouble and permits the second inject.

Thus, the stable stratification operation can be performed by controlling the fuel injection according to the state of the engine.

Next, a method of promoting the mixture of the fuel and the air is explained as follows by using FIG. 3 to FIG. 8.

Figure 3:
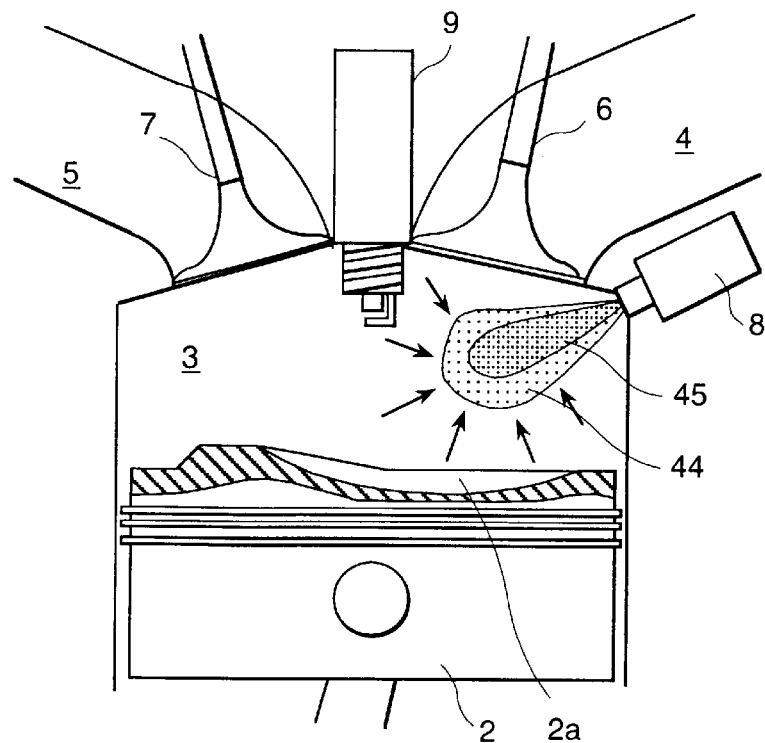
FIG. 3 is a longitudinal sectional view of the cylinder showing the state immediately after the inject when injecting once.
Figure 4:
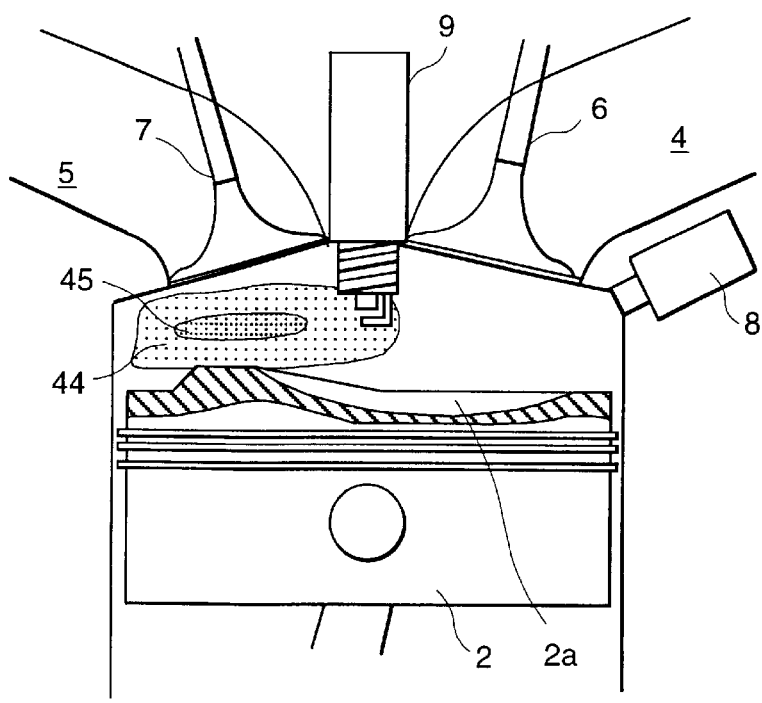
FIG. 4 is a longitudinal sectional view of the cylinder in the vicinity of top dead center when injecting once.

FIG. 3 and FIG. 4 are diagrammatic illustrations showing the state of spray under the supercharging. FIG. 3 shows the state immediately after the inject in which the fuel injection was done by one time in the compression stroke. Because the cylinder internal pressure of the compression stroke in the fuel cylinder injection engine with the supercharging machine is higher than that of the natural suction type engine, the ratio of the shrinkage of the spray externals is large.

Therefore, it is easy for overcrowded fueled part 45 where the fuel distribution in the center part of spray becomes overcrowded to be formed.

FIG. 4 shows the state in which the piston rises further, and the fuel is going to ignite immediately. At this point, overcrowded part 45 of the fuel where the mixture is not enough remains though the mixture of the fuel and the air in surroundings part 44 of spray progresses along with the movement of the fuel spray, and the mixture distribution which can be ignited exists in sparking plug 9.

Under such a condition, when the fuel is ignited, the fuel in overcrowded part 45 is exhausted to the exhaust port as the smoke or the unburnt fuel like insufficient combustion. It is necessary to avoid such a phenomenon for the exhaust.

Therefore, to perform the stratification operation under the supercharging, achieving the mixture promotion of the fuel and air becomes important.

Figure 5:
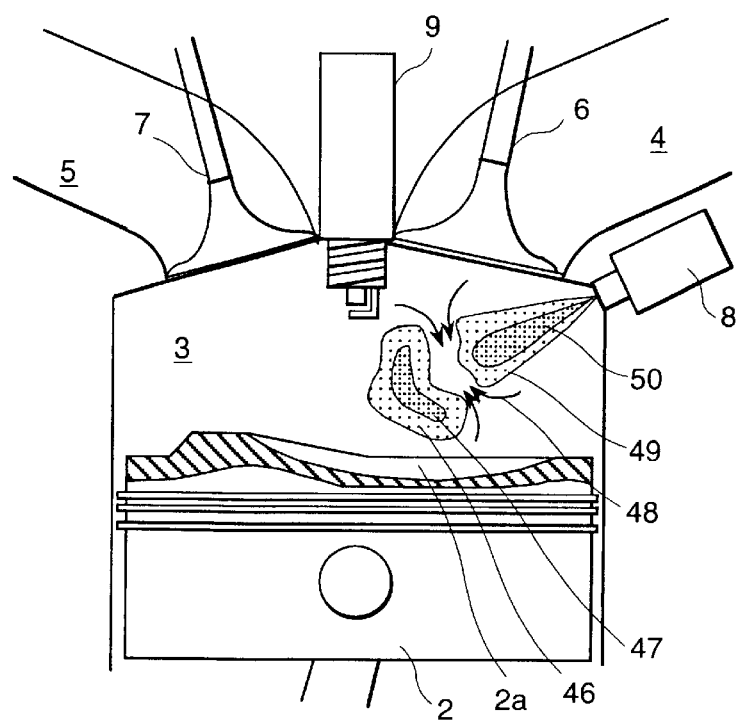
FIG. 5 is a longitudinal sectional view of the cylinder showing the state immediately after the inject when injecting twice.
Figure 6:
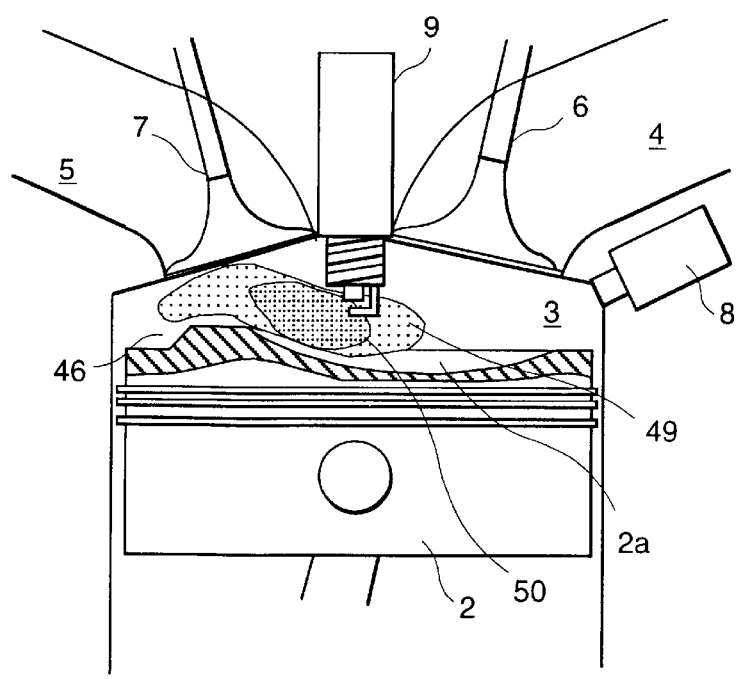
FIG. 6 is a longitudinal sectional view of the cylinder in the vicinity of top dead center when injecting twice.

FIG. 5 and FIG. 6 are views showing the divided injection which is one of the mixture promotion means of the fuel and the air. FIG. 5 shows the state immediately after the end of the second inject in which the fuel is injected twice in the compression stroke twice by using the fuel injection valve of cone spray.

Fuel spray 49 of the second inject is continuously injected following fuel spray 46 of the first injection. The surface area in the surroundings part of spray is expanded by injecting by dividing compared with the case injected by one time.

As a result, the mixture of the fuel and the air in overcrowded part 47 and 50 is improved. FIG. 6 shows the state in which the piston is raised further, and the fuel is going to ignite immediately. At this point, the mixture of the fuel and the air in surroundings part 46 of spray progresses along with the movement of the fuel spray, and the mixture distribution which can be ignited exists around sparking plug 9.

Here, the spray pen up speed of the first injection decreases as the mix of spray advances, and the second injection injected later moves in the cylinder of which pressure rises along with the piston rise.

Therefore, the period of the ignition time which can be ignited increases because the mixture distribution of the second injection overlaps with that of the first injection in the vicinity of the sparking plug. Therefore, it is possible to spark-advance in this vicinity. As a result, because the combustion time can be secured enough, the smoke can be decreased, and the HC exhaust rate can be decreased.

Figure 7:
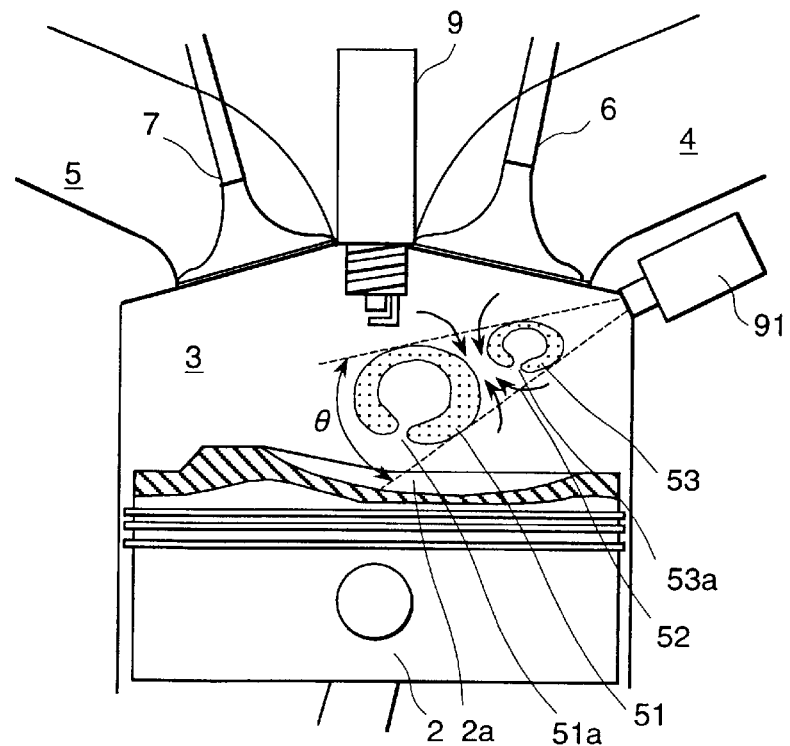
FIG. 7 is a longitudinal sectional view of the cylinder showing immediately after the inject when injecting twice by different sprays.
Figure 8:
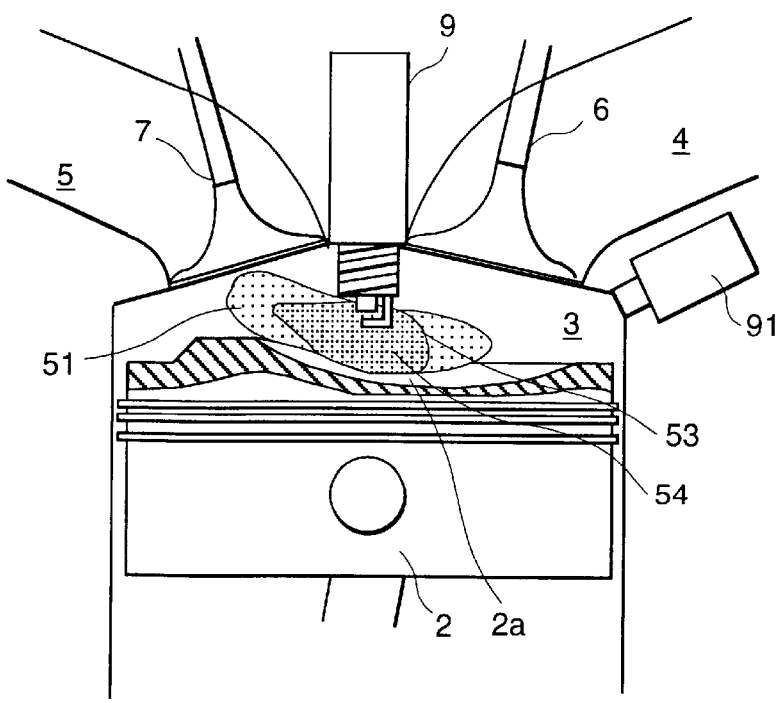
FIG. 8 is a longitudinal sectional view of the cylinder in the vicinity of top dead center when injecting twice by different sprays.

Next, the embodiment in which a different spray form is used is explained by using FIG. 7 and FIG. 8. FIG. 7 shows the state immediately after the second injection when the fuel injection valve of the lead spray is used.

The lead spray shows the discontinuous fuel distribution to a vertical side of the inject direction in which a part of the spray surroundings externals is cut.
There is a characteristic of not reducing the spray externals easily because the atmosphere in the inside of spray and the cylinder is connected by this discontinuity part 51a and 53a.

Therefore, because the width of the change of the spray external angle θ is small for the change of the charging pressure the change, and the amount of the fuel supply to the direction of the sparking plug or the change of the air/fuel ratio around the sparking plug is small, there is an advantage with excellent combustion stability when the stratification combustion where the influence of the fuel spray distribution is large is done.

The mixture of the fuel and the air is improved as well as the previous cone spray when the divided injection by this lead spray is done under the supercharging. The lead spray has the spray penetration stronger than that of cone spray, and the fast spray velocity. Therefore, there is a feature of not especially needing the air flow in the cylinder because the spray can reach the sparking plug by the power of the spray itself.

On the other hand, there was a problem that the mixture at the spray point where the speed vector is strong, and the ignition time is not able to be spark-advanced, because the spray velocity is fast.

It was possible to ignite by applying divided injection as measures even at time when the compression stroke was early. FIG. 8 shows the state immediately before the ignition, and suitable air/fuel ratio distribution for the stratification combustion compared with the case of the above-mentioned cone spray increases around the sparking plug, and the combustion stability is improved. As a result, the range of the selection of the ignition time which can be ignited extends. Therefore, there is an effect also in the fuel consumption improvement because suitable ignition time of the combustion pattern is set.

Figure 9:
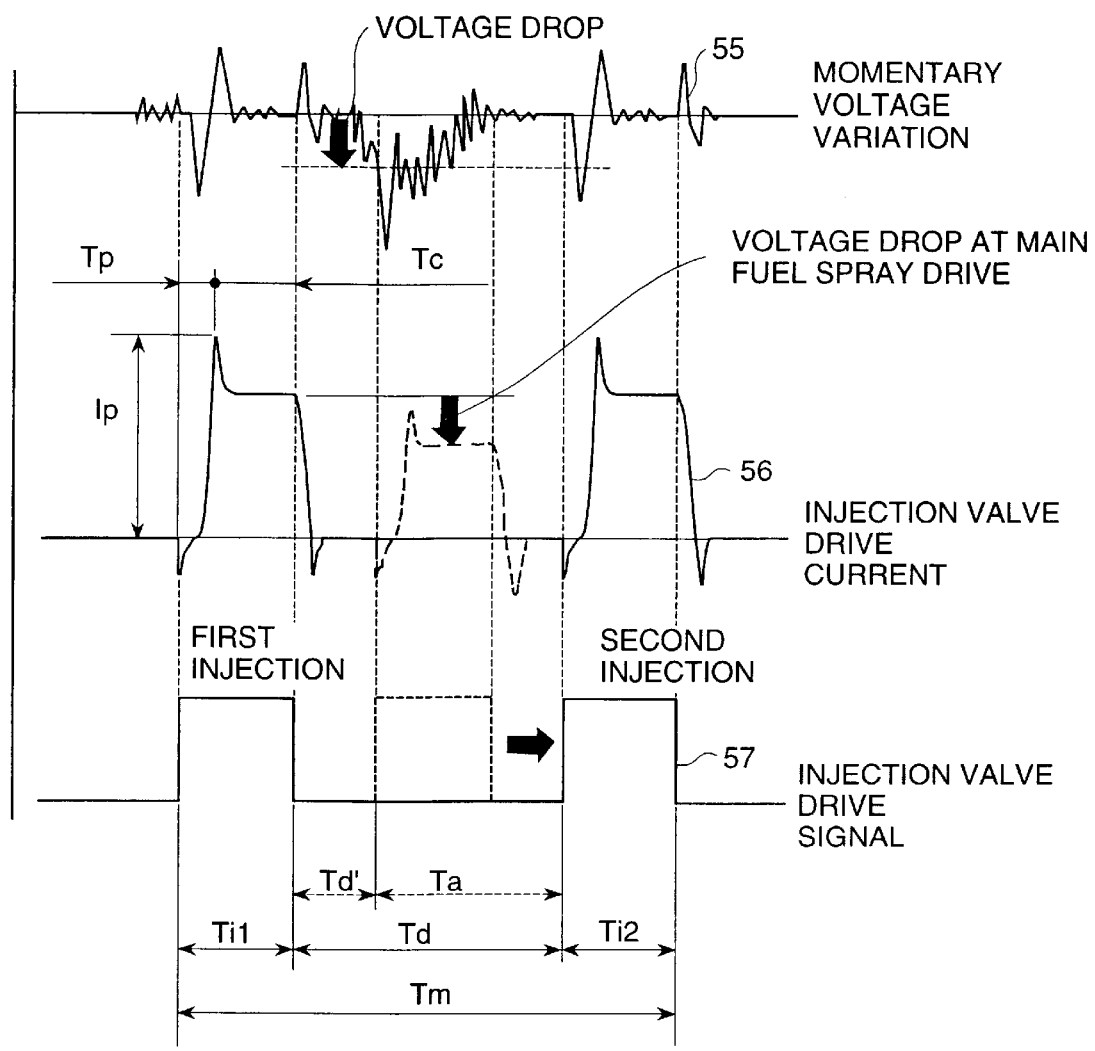
FIG. 9 is a chart showing a control method of the voltage drop detection.

Next, a method of controlling divided injection is described by using FIG. 9.

FIG. 9 shows the relationship between injection valve drive signal 57 controlled in ECU 33 and injection valve driving current 56, further the relationship between injection valve drive signal 57 controlled in ECU 33 and instantaneous voltage fluctuation 55 which is the monitor value of the power supply line voltage supplied by battery 34.

Here, the total fuel spray amount decreases when fuel injection valve driving current (Tc) for the main spray decreases when the second inject is injected in case that the change of the engine electric load is large. Therefore, the air/fuel ratio becomes lean for the injection amount of the engine demand, and such a state causes the accidental fire.

The exhaust emission not only deteriorates greatly when the accidental fire occurs but also the obstacle is caused in the operability of the serge torque change etc. Therefore, it is necessary to avoid the accidental fire.

Next, the total fuel spray amount demanded from the engine speed and the engine load is decided, and, in addition, the injection allotment rate of the first injection and the second injection and injection intervals are decided according to the engine operating condition.

As shown in FIG. 9, the initial value of the fuel injection valve drive signal is the total injection time (Tm)=the first injection time (Ti1)+injection interval(Td')+second injection time (Ti2).

Here, it is necessary to assume the possibility that the voltage drop of the power supply line voltage (instantaneous voltage fluctuation) is generated according to some factors after the rising of injection valve drive signal 57 of the first injection. The reason for this is that the electric load of the engine always changes by the operating state and/or the state of the vehicle.

For instance, there are the difference of the amount of the AC dynamo charge by the engine speed, the battery voltage fluctuation due to the load change of the accessories caused by the air conditioner operation or by the motor operation of the automatic window and/or the wiper, etc. Moreover, the voltage drop by the valve-open drive of the first injection can be thought.

For instance, instantaneous voltage fluctuation 55 is always monitored from the power supply line of ECU 33 to exclude the above-mentioned voltage fluctuation factor as the next stage where divided injection is executed. The value of Ip which is the peak magnitude of the fuel injection valve driving current of the first injection and Tp which is the rise time of Ip is compared with the value stored in ECU 33, when the approximated fuel spray of demand and under the operating condition approximated to the value of last time, preferably the control condition of the representative operating condition.

As a result, extension time Ta is added so that Td' may be extended at time when the voltage drop is admitted after the first injection begins, and the result is recreated as Td. Here, when extension time Ta is set, it is also possible to change the extension ratio by the operating condition (supercharging pressure, engine speed, and engine load). Moreover, it is possible to set extension time Ta single meaning by the control map.

Moreover, it is possible to reduce the operation load when divided injection is controlled if injection interval Td is decided beforehand at fixed interval time, and thus the response of the switch in inject frequency and injection intervals is improved. Moreover, the memory capacity in the ECC is decreased The setting of the time interval of Td can be decided in consideration of the high revolution time when the period which can be injected becomes a short time. There is an effect that the response at the switch goes up, and divided injection can be flexibly done from the high revolution to the low revolution if the minimum time interval is assumed to be 0.5 ms or more.

FIG. 10 is a view where the control by which injection interval Td is retarded when the voltage drop is detected on the way of divided injection is illustrated in the crank angle.

Figure 24:
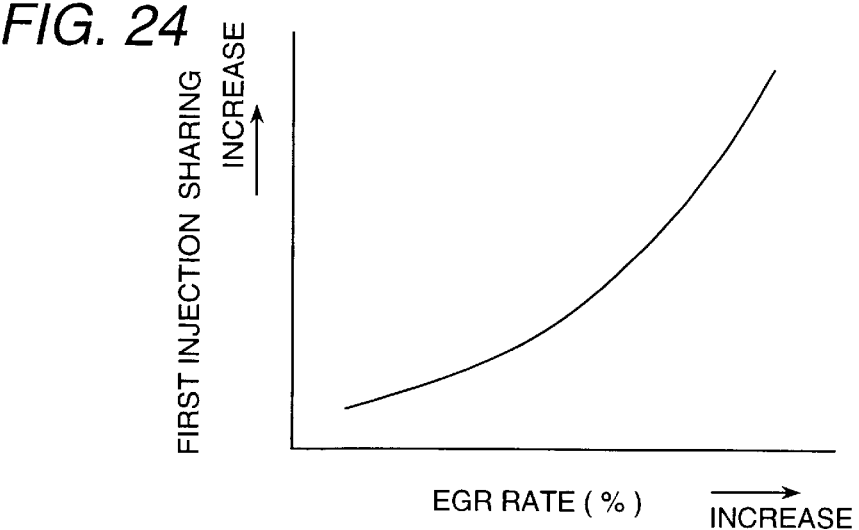
FIG. 24 is a view showing the injection allotment rate of the first injection.

FIG. 24 shows the allotment rate of the first injection when the internal EGR is done by the valve drive changeability control described later, and divided injection is done. To raise the allotment rate of the first injection, the control is executed as the EGR rate increases.

There is a tendency that the combustion stability becomes unstable if the EGR rate is raised. In the embodiment according to the present invention, because the mixture of the fuel spray and the air advances by the combustion gas introduced by the internal EGR, fuel spray included in an allotment rate of the first injection can be increased in the operating condition with a lot of EGR rates.

As a result, because the EGR rate can be raised further, the decrease in NOx can be achieved without ruining the combustion stability.

Next, FIG. 11 shows the corrective action when divided injection cannot be permitted according to the operating condition of the engine. A unburnt fuel is exhausted to the exhaust side because the valve overlap of the suction and exhaust valves is large at the high revolution when the fuel injection is begun immediately before top dead center (TDC) of the compression and the hydrocarbon exhaust rate increases.

Moreover, the amount of the hydrocarbon exhaust increases because of an increase in the amount of the fuel adhesion on the crown face of the piston raised even in case of the low revolution. Or, the amount of the hydrocarbon exhaust increases because of an increase in the amount of the spray fuel adhesion to the combustion chamber wall when the deflection spray directed to the sparking plug is adopted. Therefore, these are undesirable from the view point of clean exhaust.

Therefore, less than 30° BTDC for instance is preferable though the end limit of the second inject is controlled also by the operating condition.

When the second injection becomes more than 30° BTDC which is the inject end limit as a result of the divided injection control pre-recorded, divided injection is not permitted, and one time injection is adopted.

In this case, when the engine speed is a high revolution, the control is performed to advance the timing when the first injection is started, and the evaporation time is secured.

Moreover, injection time Ti1 and Ti2 are set to grow more than the value of minimum linearity compensation flow amount Qmin of the fuel injection valve.

It is not to permit divided injection when the fuel spray calculation value of the second inject is below the value of Qmin, and the injection valve is controlled to inject by one time.

Figure 12:
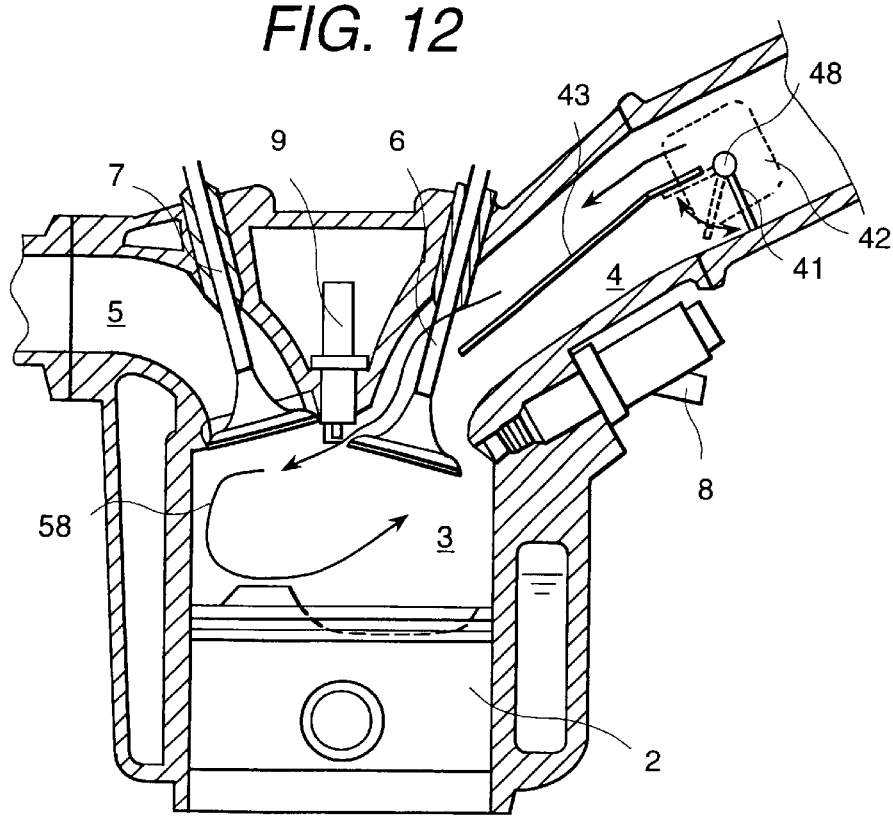
FIG. 12 is a longitudinal sectional view of the cylinder at the intake stroke showing an air flow mechanism.
Figure 13:
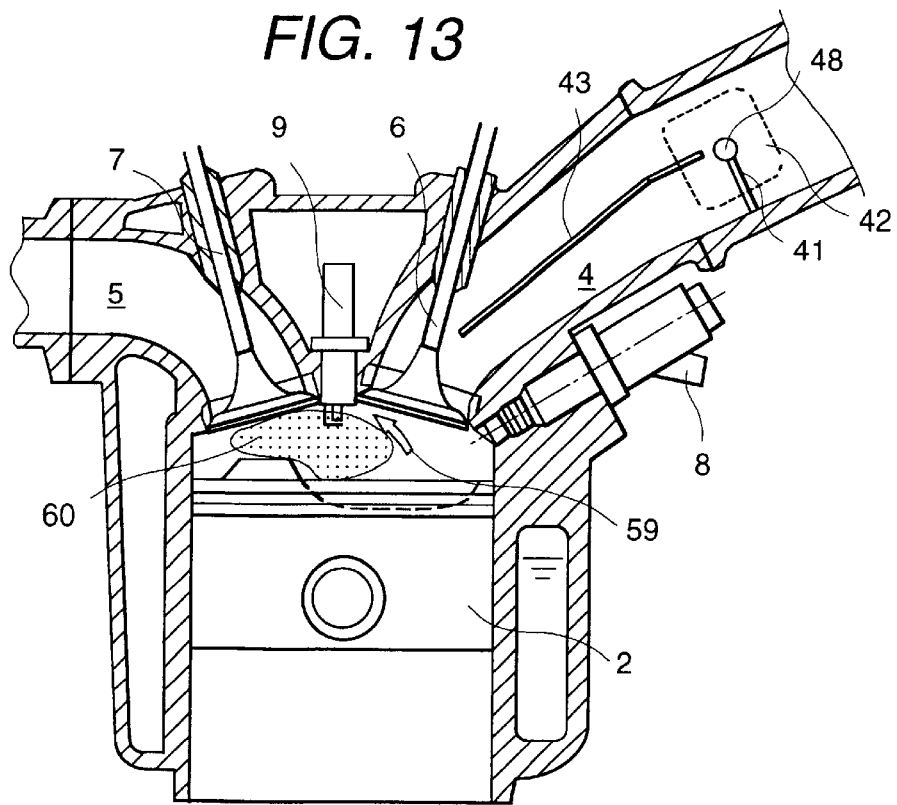
FIG. 13 is a longitudinal sectional view of the cylinder in the compression stroke showing the air flow mechanism.

Next, a method of achieving the mixture promotion of the fuel and the air by using the air flow changeability means is explained by using FIG. 12 and FIG. 13.

FIG. 12 is an engine which has TCV changeable IOC which is the tumble stream generation means in the suction port, and the state at the intake stroke is shown.

There is provided a partition 43 for dividing the inside to the upper and lower portions in suction port 4. Opening and shutting valve gear 42 driven by the motor or the diaphragm actuator is set in the intake pipe 26 faced suction port 4, and is supported so that opening and shutting valve 41 may synchronize and rotate to shaft 48 of said opening and shutting valve gear.

As a result, the opening space in a lower passage of the suction port into which opening and shutting valve 41 is divided can be changed, and strength of the air flow generated at the intake stroke can be increased and decreased.

forward tumble stream 58 is generated by shutting the lower side of the suction port, and increasing the amount of ventilation which passes the upper part of the suction port in the cylinder in FIG. 12.

Next, the state of the compression stroke in the same engine as FIG. 13 is shown. Fuel spray 60 moves from the suction valve side to sparking plug 9, because forward tumble stream 58 preserved up to the compression stroke flow sparking plug 9 through the vicinity of suction valve from piston crown face 2a.

Thus, the mixture of an air/fuel ratio suitable to ignite can be ignited because the progress degree of the mixture of the fuel and the air increases from spray outer part, and rises in the direction of the sparking plug 9 by forward tumble in which the overcrowded part of the fuel is preserved even if it is one time injection under the supercharging.

However, the inhalation passage resistance increases because the partition plate is installed in the suction port. Therefore, it is necessary to consider the decrease in maximum horsepower in the operation area of the throttle opening completely where engine power is valued.

Figure 14:
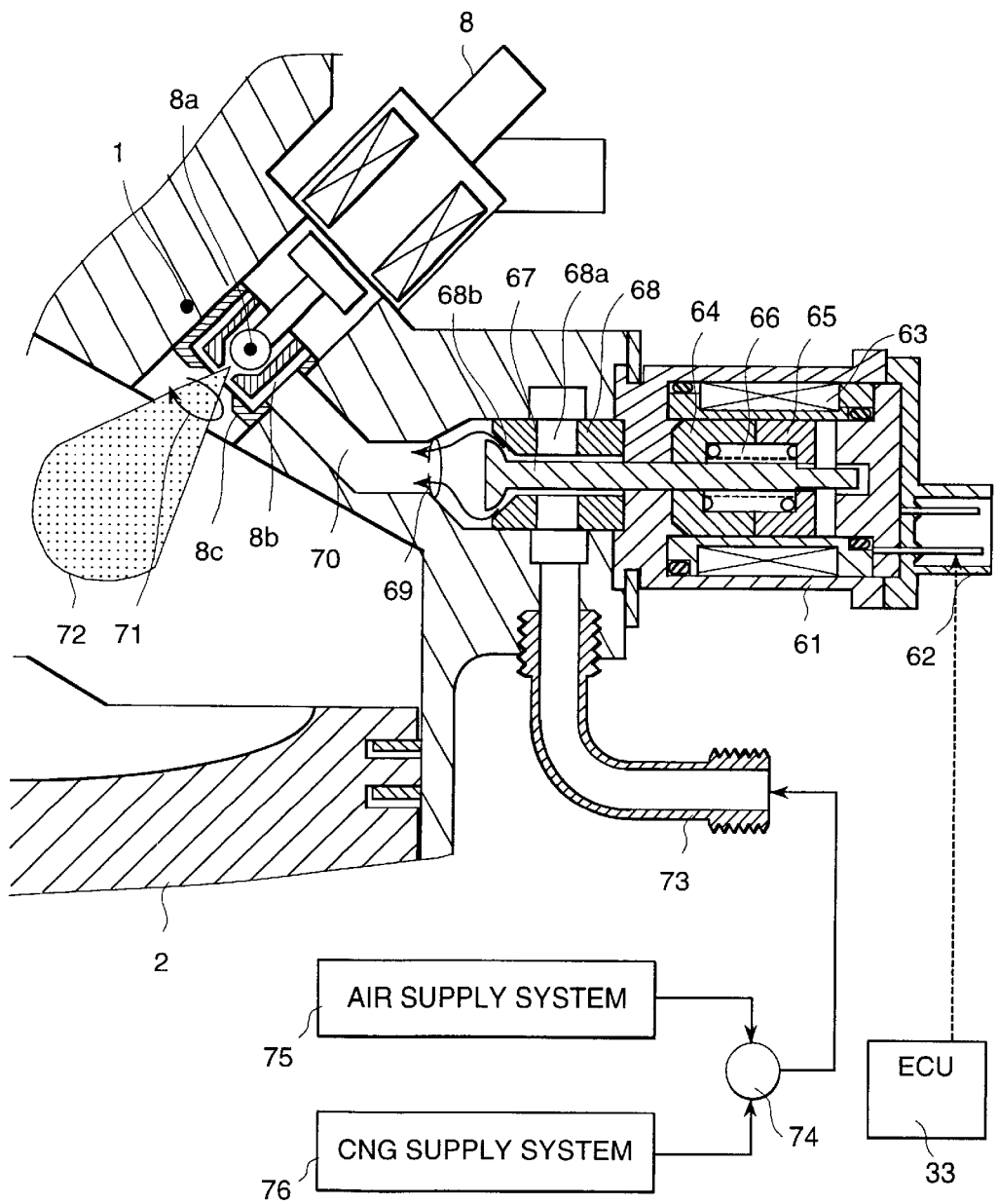
FIG. 14 is a longitudinal sectional view showing the state of the injection of the mechanism with a gas injection valve.

Next, the mechanism for mixing the fuel with the air beforehand and injecting in the cylinder is explained by using FIG. 14 to FIG. 17. FIG. 14 is a partial view showing the upper part of the combustion chamber of the fuel cylinder injection engine with the supercharging machine which is one embodiment of the present invention. turn room 8d is formed between nozzle 84 of fuel injection valve 8 and mixture nozzle 8c. Turn room 8d leads to injection valve 67 of gas injection valve 61 via gas passage 70.

Said injection valve 67 is connected to switch valve 74 via inlet 68a and gas piping 73. Said switch valve 74 is connected to air supply system 75 and CNG supply system 76 (CNG:liquefied natural gas).

Air supply system 75 introduces the air from a certain position between suction system in the previous stage of the suction valve or air flow meter 23 and suction port 4 to switch valve 74 through another piping. CNG supply system introduces the CNG from CNG storage tank to switch valve 74 through the piping where airtight is maintained.

Next, the configuration of the gas injection valve is explained. In FIG. 14, a gas injection valve of an electromagnetic coil type is used. Gas injection valve 61 has connector 62 which receives the driving current from ECU 33, coil 63 which forms a magnetic circuit when the driving current is given, core 64, plunger 65, and injection valve 67 which moves in synchronization with plunger 65. Moreover, when the driving current does not given, the space between gas passage 70 and inlet 68a is sealed up and intercepted by pressing injection valve 67 against sheet surface 68b of spray nozzle 68 by the expansion load of spring 66.

Next, the injection control method of gas injection is described.

Switch valve 74 is open to supply the gas (air or CNG) from either of the air supply system 75 or CNG supply system 76. Next, the driving current is added from ECU 33 to coil 63 through connector 62 in the intake stroke when the gas can be injected. As a result, plunger 65 overcomes the energizing power of spring 66 by core 64 being magnetized and generating the attraction, and plunger 65 displaces in the direction of core 64. Injection valve 67 parts from sheet side 68b of the spray nozzle along with the displacement of plunger 65, and the sheet part is open.

Gas 69 led from switch valve 74 into gas piping 73 and inlet 68a flows to turn room 8b through gas passage 70.

On the other hand, ball valve 8a starts from ECU 33 fuel injection valve 8 by driving signal of the fuel injection beginning and the fuel injection of away starts from the sheet side of the nozzle.

And, air 69 inflowed to turn room 8b is mixed with the fuel spray in the previous side of mixture nozzle 8c, and injected to combustion chamber 3 as fuel spray 72 which is accompanied by inject stream 71. The gas injection can precede (*O) though the operation mentioned above begin the fuel injection simultaneously with the biginning of the gas injection.

Thus, because the fuel spray can be made fine by adding jet stream 71 by the gas injection to the fuel injection, the mixture of the fuel spray and the gas is promoted. Moreover, there is an effect that the receiving heat of nozzle 84 of the fuel injection valve is decreased as another effect that the gas is injected along with the fuel injection.

The reason for this is to be assumed the configuration that nozzle 84 of the fuel injection valve does not touch the combustion chamber wall by the space of turn room 8b, and the exhaust heat effect due to the gas injection is provided further. There is an effect that the amount that the product material caused by combustion, so-called deposit adheres to the nozzle part can be decreased if the temperature decrease in the nozzle part of the fuel injection valve.

Figure 15:
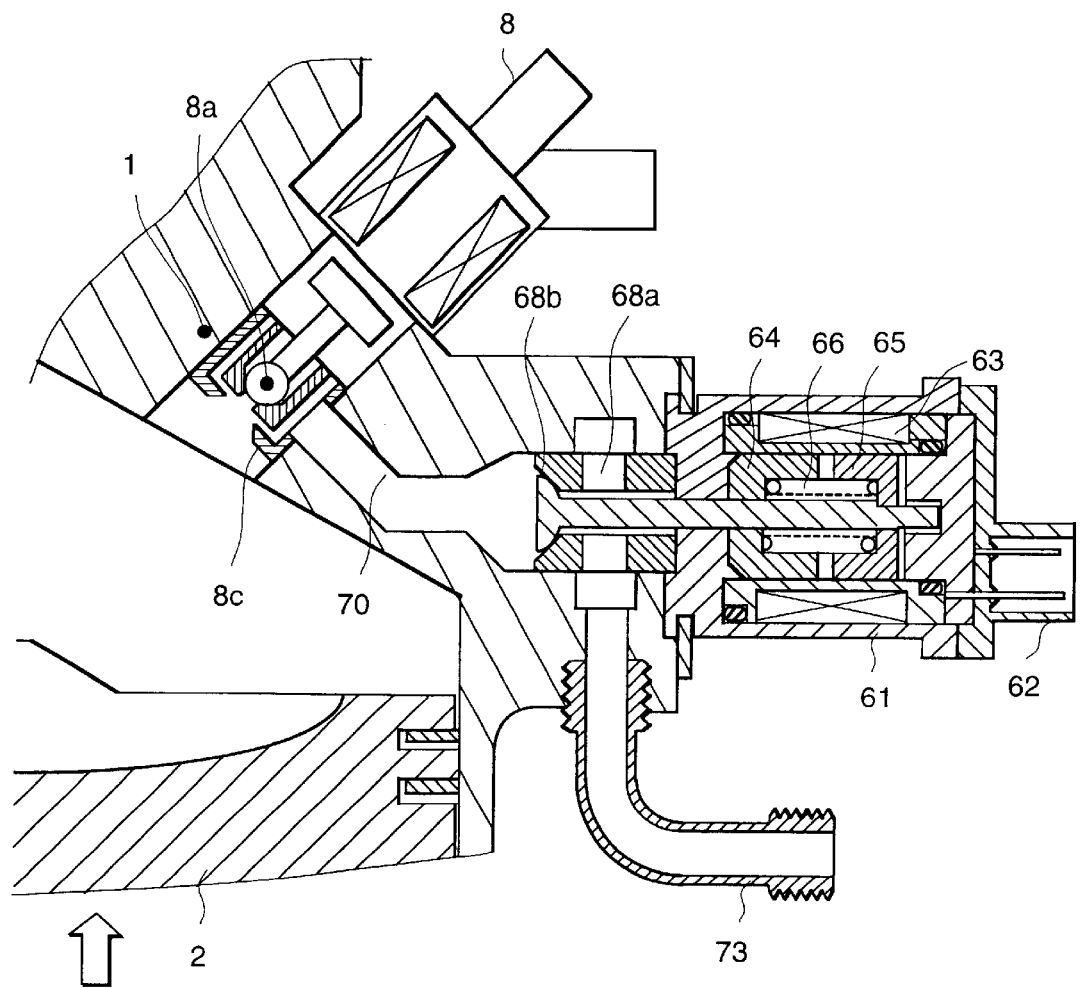
FIG. 15 is a longitudinal sectional view showing the state of the valve-close of the mechanism with a gas injection valve.

FIG. 15 shows the state of the compression stroke after the fuel injection and the gas injection is completed.

Internal pressure of the cylinder improved by combustion is applied to injection valve 67 of the gas injection valve through gas passage 70. However, because this pressure is applied in the direction of the close of the injection valve, the sheet part is not opened.

Only the gas injection can be also done according to the above-mentioned configuration. As a result, it is possible to supply by switching the liquid fuel and the gaseous fuel in the engine having a plurality of fuel systems.

Next, one embodiment of the engine which can promote the mixture of the fuel and the air by using a gas injection valve is explained with reference to FIG. 16 and FIG. 17.

Figure 16:
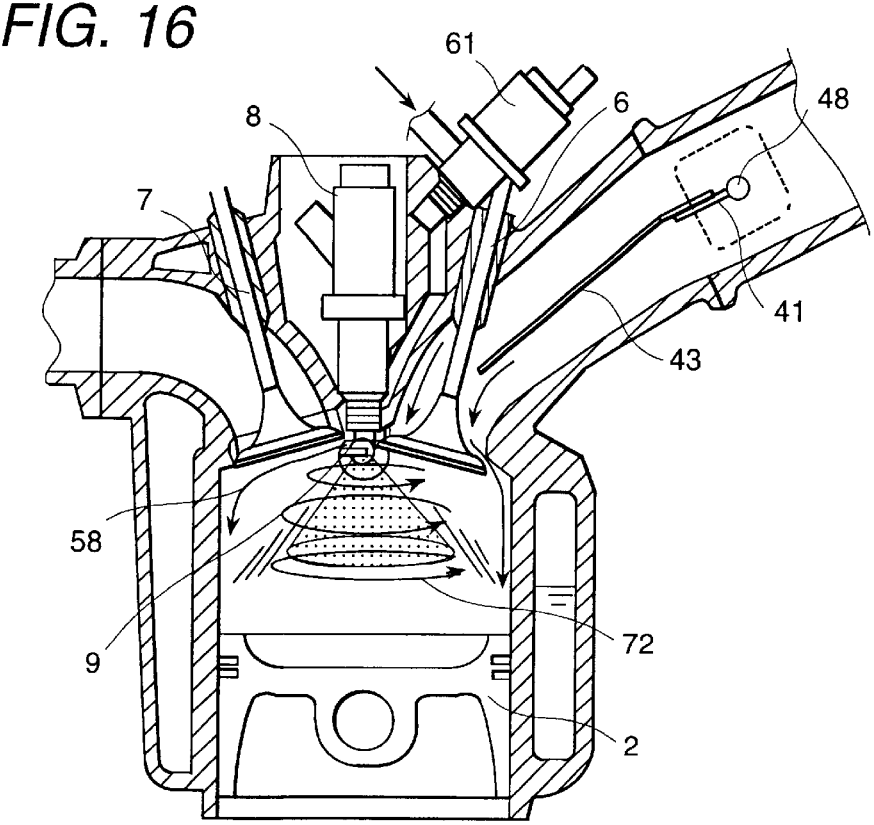
FIG. 16 is a longitudinal sectional view showing the intake stroke of an engine with a gas injection valve.

The engine shown in FIG. 16 has the gas injection valve, and has the tumble stream generation mechanism in suction port 4. Moreover, fuel injection valve 8 is arranged between suction valve 6 and exhaust valve 7.

When suction valve 6 is opened in the intake stroke, the supercharged air inflows combustion chamber 3 from the space of suction valve 6 and the valve seat through suction port 4.

Here, because the homogeneous operation is performed at the intake stroke and the output is weighted in its drive area, opening and shutting valve 41 is open. Next, the driving current is output at the fuel injection timing suitable to burn from the electronic control unit, and gas injection valve 61 operates, and the gas led from the gas piping is injected from the mixture nozzle to combustion chamber 3.

In addition, the fuel is mixed with the gas in the mixture nozzle when fuel injection valve 8 operates, and the fuel is injected, and the fuel spray made fine particles is turned in the combustion chamber by previous injection stream 72.

Here, the fuel spray is stirred by tumble stream 58 and the downflow caused by piston 2, etc. However, the pen up speed decreases, and making fine particles is accelerated, because this fuel spray turns to turn round the surroundings of the cylinder wall by inject stream 72.

Therefore, the density of the fuel spray does not become excessive even in about sparking plug 9 arranged in the vicinity of the nozzle of the fuel injection valve. Therefore, the flame spread after igniting improves, and the stability of combustion improves. As a result, the exhaust is made clean.

Figure 17:
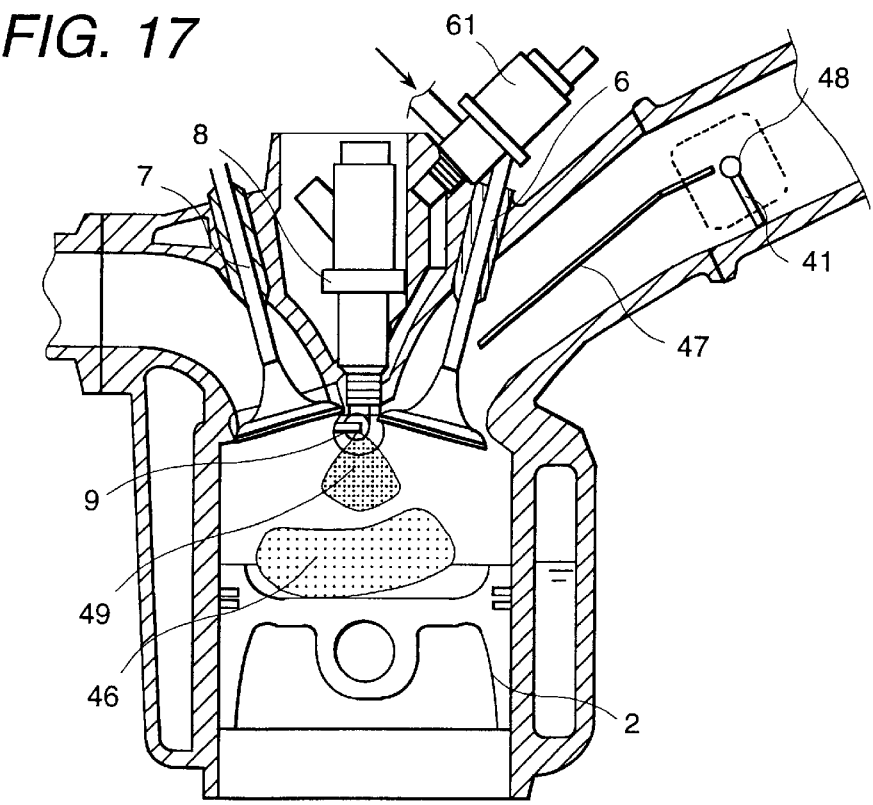
FIG. 17 is a longitudinal sectional view showing the compression stroke of an engine with a gas injection valve.

Next, FIG. 17 shows the state of the stratification drive in which the injection is executed in the compression stroke which is on the way that the piston is rising. Opening and shutting valve 41 has been shut, and the tumble stream generated at the intake stroke is preserved to the compression stroke, and the mixture advances from surroundings of the fuel spray aiming at the center as mentioned above.

Here, divided injection is done, and the second injection is injected to the fuel spray formed by the first injection after the injection interval.

In addition, when the compression stroke advances, fuel sprays 46, 49 formed with the 1st injection and the 2nd injection comes to overlap, and the fuel spray with the air/fuel ratio density suitable to ignite around sparking plug 9 is formed.

Because it does not need to spark-advance the ignition time for the securing of the evaporation time when the stratification drive is done, it is possible to ignite in the vicinity of top dead center according to the above-mentioned cylinder injection engine with the supercharging machine.

Therefore, the pressure rise due to combustion can be effectively used, and fuel consumption can be improved.

The gas injection is not done because cylinder internal pressure is high at the compression stroke. However, it is possible to inject the gas besides the intake stroke when providing with the pressurizing source of about 3 MPa or the compression air pump driven by the engine.

Next, a method of promoting the mixture of the fuel and the air using a valve drive-changeable means is explained by using FIG. 18 to FIG. 24, and.

Figure 18:
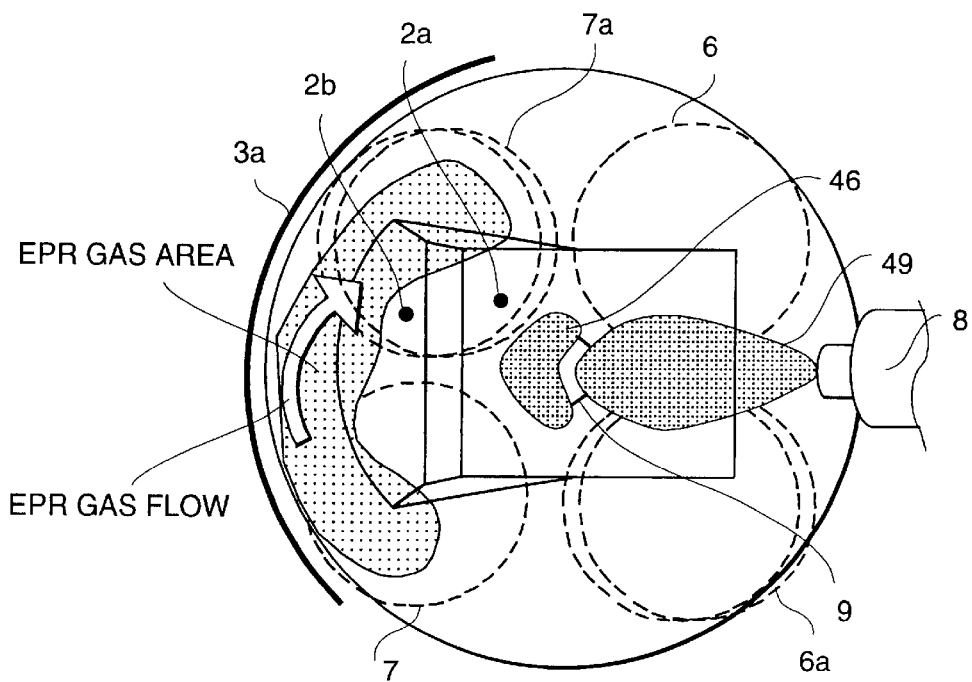
FIG. 18 is an upper view showing the flow of the EGR gas when the internal EGR is done.
Figure 19:
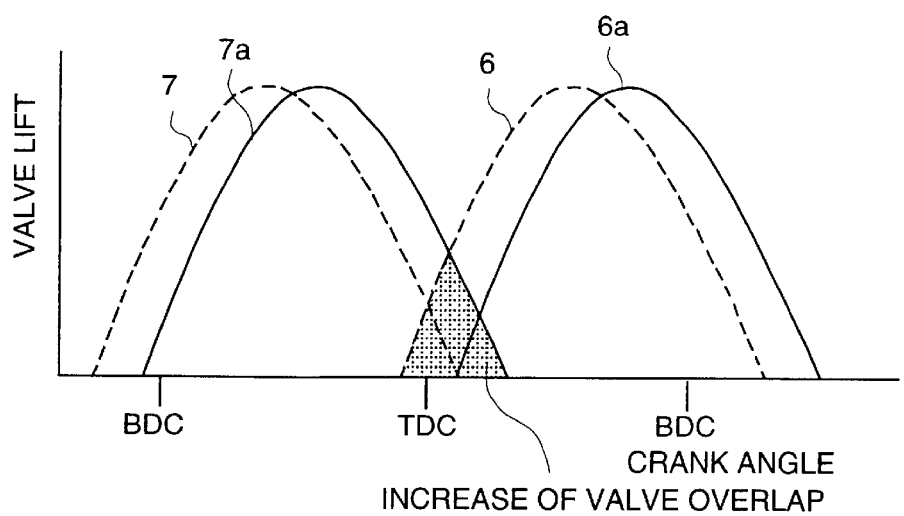
FIG. 19 is a valve timing chart of the changeable valve drive control.
Figure 20:
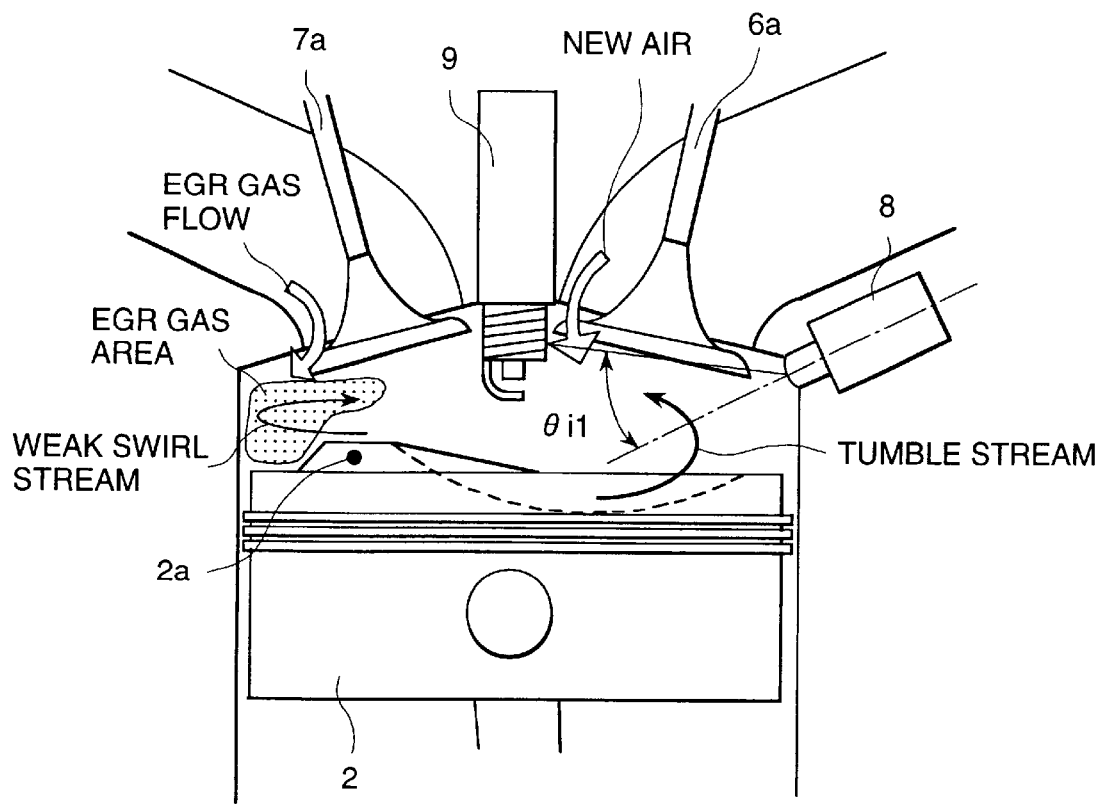
FIG. 20 is a side elevation showing the flow of the EGR gas when the internal EGR is done.

FIG. 18 is a top view showing the cylinder. FIG. 19 shows the operation timing of the valve. FIG. 20 shows the air flow in the intake stroke.

The valve overlap in a pair of suction and exhaust valves is expanded by spark-delaying the valve-close time of exhaust valve 7*a* and spark-delaying the valve-open time of suction valve 6*a* in the diagonal direction of exhaust valve 7*a* at the same time when the charging pressure is low, and the engine speed is in the drive area of the low revolution.

As a result, the internal EGR is done by a combustion gas of the high temperature on the exhaust port side already being introduced during the intake stroke in the cylinder.

Here, the suction port form is set in the engine of the present invention as shown in FIG. 20 so that the inhaled new air may generate tumble stream 58 directed to the sparking plug from the piston center section via the cylinder wall side where the fuel injection valve was arranged. To preserve the above-mentioned tumble stream 58 even in the compression stroke on the piston crown face, tumble guide groove 2*a* is provided.

The swirl component relatively becomes strong at the low revolution in which the air flow in the cylinder is weakened because the phase difference is given at the valve-open time of right and left valves of the suction valve.

Moreover, swirl guide part 2*b* formed by the convex parts provided at a constant interval is provided between the cylinder wall and the piston crown face of the exhaust side of above-mentioned tumble guide groove 2*a*.

As a result, the EGR gas area is made by making the majority of the burnt gas led from exhaust valve 7*a* flow along the cylinder wall of the exhaust side during the intake stroke already as shown in FIG. 18. Therefore, diffusion can be suppressed.

Because the ratio which the EGR gas mixes with a new nature decreases by such a configuration, and the temperature rises effectively around the cylinder wall on the exhaust side. Therefore, the mixture of the fuel spray and the air is advantageously improved. The fuel spray injected from fuel injection valve 8 is directed to the sparking plug with respect to the center line of the axis of the fuel injection valve to aim at sparking plug 9. The direction is set properly within the range of angle θi1 as shown in FIG. 20.

As a result, the effect that the robustness of the combustion stability is improved is obtained, because the mixture distribution in the upper part of the combustion chamber can obtain the density of the air/fuel ratio suitable to ignite.

The embodiment in which divided injection is done in the latter half of the compression stroke in the valve drive-changeable control is explained next. FIG. 2 shows the configuration of the fuel cylinder injection engine with the supercharging machine. Bypass valve 31 connected to exhaust passage 30 by bypassing turbine 29 of the turbocharger from exhaust manifold 28 is provided.

Here, the divided injection control is done after the mid-term of the compression stroke at the cold engine.

In addition, the valve overlap is expanded by either of driving methods of the above-mentioned the valve drive and changeability control, and the unburnt fuel is supplied to the exhaust passage side. Moreover, the temperature of catalytic converter 32 can be risen effectively by maximizing the opening space of said bypass valve 31, and bypassing turbine 29 of the turbocharger.

Because the activation at the early stage of catalytic converter 32 can be accomplished by assuming the above-mentioned configuration at the cold engine, it is possible to clean the exhaust when starting. Setting the above-mentioned control time can be decided according to the signal from the exhaust gas temperature sensor 39 provided in exhaust passage 30 and the engine water temperature from water temperature sensor 21 so that the temperature of catalytic converter should not go up too much. Moreover, the arbitrary time can be set by the timer by making the start at the time of beginning of the control.

The fuel cylinder injection engine according to the embodiment of the present invention has a means for promoting the mixture of the fuel and the air. Therefore, the present invention can use the strong penetration injection valve as a combustion concept of the spray lead method to carry the fuel to the sparking plug by the spray penetration of the injected fuel spray though it does not choose the form of the fuel spray.

Next, the effect of the use of the strong penetration injection valve is explained described as follows.

It becomes possible to perform the stratification drive at higher revolution by using a strong penetration injection valve compared with the swirl stream generated by the conventional air flow generation mechanism installed in the intake pipe or a so-called air guide method in which the fuel spray is carried by the air flow of which main stream is a tumble stream.

It is concretely confirmed by the engine experiment on the stand that the stratification drive to about 3200 r/min can be executed.

If the expansion of the drive area of the stratification drive can be accomplished, a more improvement effect of the fuel consumption can be expected. Therefore, the strong penetration injection valve is designed to strengthen the spray penetration, in order to carry the fuel spray to the sparking plug with stability even if the tumble stream strengthens at the high revolution. The combustion concept of the fuel cylinder injection engine with such a fuel injection valve which strengthens such spray penetration is called a spray lead method.

However, the spray reaches the cylinder wall on the exhaust side at the low revolution because the pen up speed of the injected fuel spray is fast when the spray form suitable for the high revolution is used. Therefore, the hydrocarbon exhaust rate increases. Moreover, the smoke exhaust rate increases due to the above-mentioned contact of the spray to the cylinder wall at the low revolution, and the drive area where the stratification drive is possible narrows. Countermeasures can be done by doing divided injection in the compression stroke to solve these problems.

There is a problem with an especially large reduction ratio of the fuel spray in the fuel cylinder injection engine with the supercharging machine compared with the natural suction type engine though the method of divided injection was mentioned above.

The mixture promotion means of the fuel and the air in the compression stroke is especially effective in the decrease of the smoke and the hydrocarbon exhaust rate, because said reduction ratio becomes more remarkable at a high supercharging, and the rise of cylinder internal pressure joins in the compression stroke, too.

Here, because the mixture of the fuel spray and the air is promoted in the compression stroke if the injection interval between the first injection 46 and the second injection 49 is assumed to be ultra short time as shown in FIG. 5, there is no obstacle in the flame spread because the mixture by twice injection is continuously distributed. Thus, the combustion stability can be kept excellent. The spray cannot be ignited due to evaporation shortage when the lead spray with the fast speed vector at the spray point reaches sparking plug 18, because the pen up speed of the fuel spray is fast in the one time injection.

When time passes more as shown in FIG. 4 and the piston approaches the compression top dead center, and the entire spray passes sparking plug 9 almost at the point which enters a state advanced by the evaporation which can be ignited. As a result, the ignition time approaches the compression top dead center. It shortens the combustion period, and gives disadvantage for the hydrocarbon decrease.

On the other hand, because the mixture by the divided injection shown in FIG. 5 slows the passing speed, and becomes possible to ignite by the lead spray, the combustion period can be secured enough even if the ignition time is spark-advanced. Therefore, the effect that the hydrocarbon can be decreased is achieved Next, the embodiment in which the mixture of the fuel spray and the air is promoted is explained hereinafter by using the valve drive and changeability control.

FIG. 19 shows valve timing when the internal EGR is done.

Figure 21:
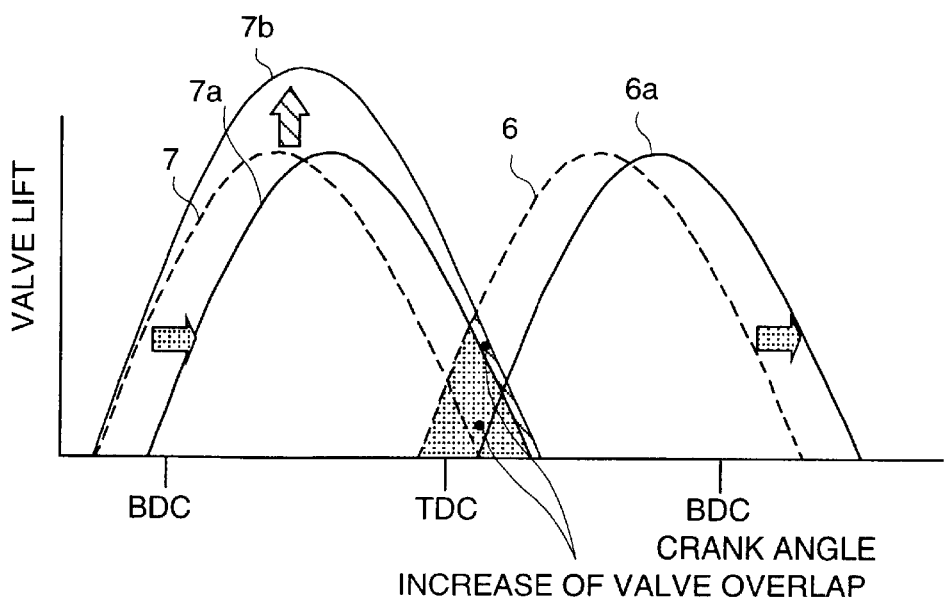
FIG. 21 is a valve timing chart of a different changeable valve drive control.

Here, the phase difference is put at the valve-open time of the right and the left suction valves. In addition, the valve-close time is spark-delayed by an exhaust valve changeable actuator, and the valve overlap is expanded on the exhaust valve side. FIG. 21 is a method of executing another internal EGR. In this method, the valve-close time of the exhaust valve is spark-advanced, the valve lift of the exhaust valve is increased, and the control to supplement the amount of the introduction of the EGR gas is performed.

Figure 22:
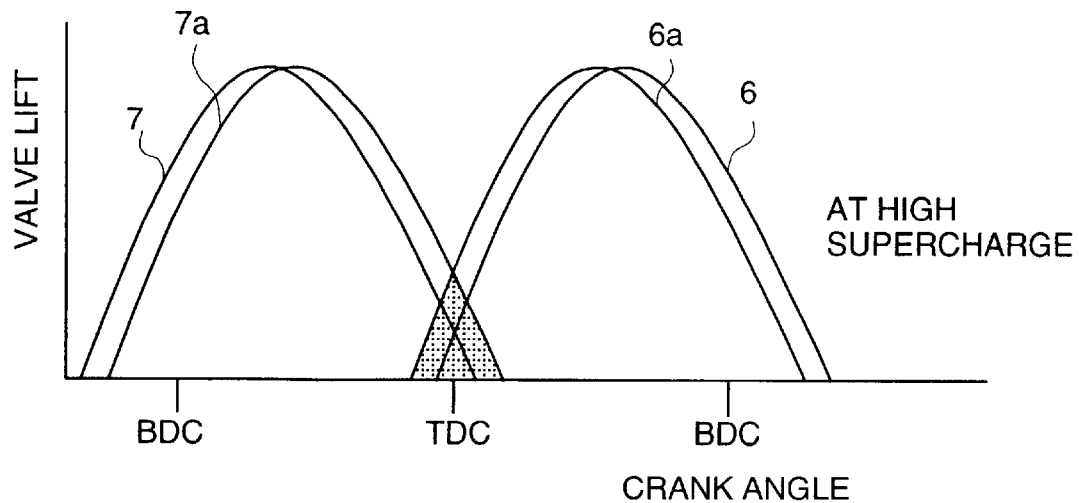
FIG. 22 is a valve timing chart of a different changeable valve drive control.

The phase difference of about 10° is given beforehand respectively to the right and the left valve-open time of the suction valve and the exhaust valve in the crank angle in the embodiment shown in FIG. 22.

The overlap is expanded by spark-delaying the valve-close time of exhaust valves 7 and 7a and spark-advancing the valve-open time of the suction valve, and the internal EGR is executed at the low supercharging or the low revolution.

The valve arrangement of the suction and the exhaust valves for giving them the overlap beforehand is determined in consideration of the direction of the swirl stream strengthened when the overlap is expanded and the injection direction of the fuel injection valve, and is not limited within the scope of this embodiment.

Figure 23:
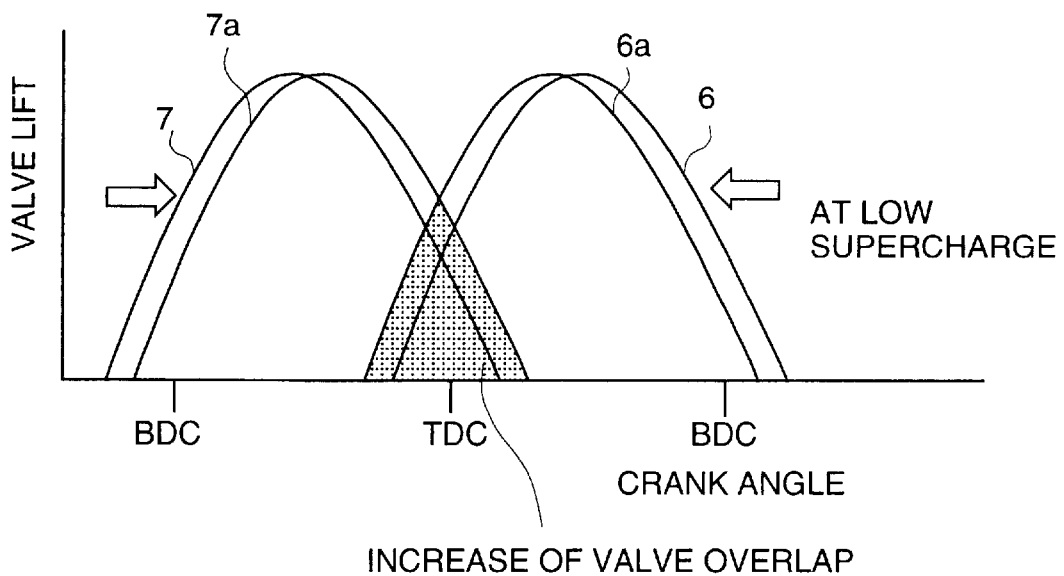
FIG. 23 is a view showing the state in which the valve timing is shifted from the stage of FIG. 22.

In the embodiment shown in FIG. 22 and FIG. 23, a valve changeable mechanism has the structure in which the camshaft is twisted. Therefore, a simple structure can be adopted compared with the mechanism which changeable-controls the phase difference of the right and the left valves.

As a result, the increase of durability of the valve operating mechanism can be achieved. Moreover, there is an advantage that it is possible to lighten the mechanism. Furthermore, the robustness is improved for the internal EGR because the valve overlap can be continuously increased when shifting from a high supercharging to a low supercharging, and the control is performed while judging the combustion stability.

Here, the combustion stability when the internal EGR is executed is determined by detecting the rotational fluctuation of ring gear 19 and the angular velocity change by using rotation sensor 20, and referring the preset control map by the rotational fluctuation detection program in ECU 33. As a result, even if a plurality of mixture promotion means of the fuel and the air are combined, the combustion stability is never ruined.

Next, the spray form and the configuration of the strong penetration injection valve used for the above-mentioned spray lead method are explained by using FIG. 25 to FIG. 31.

Figure 25:
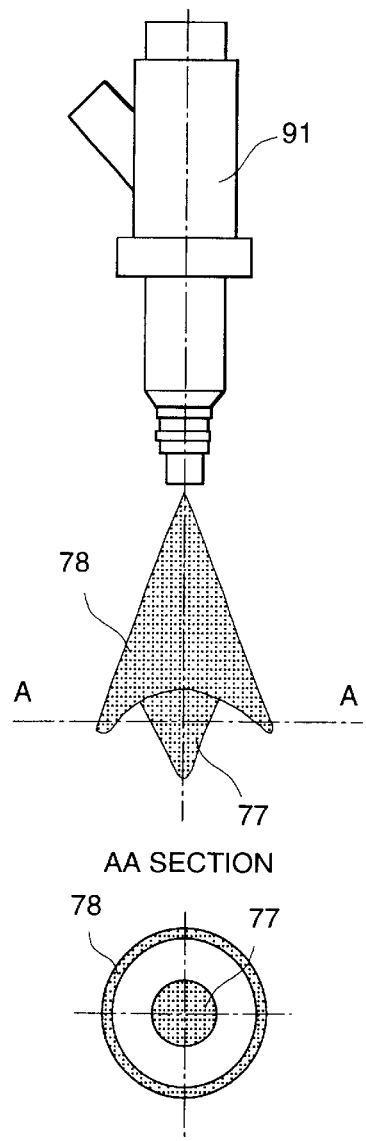
FIG. 25 is a view showing the spray form of the spray with initial spray.
Figure 26:
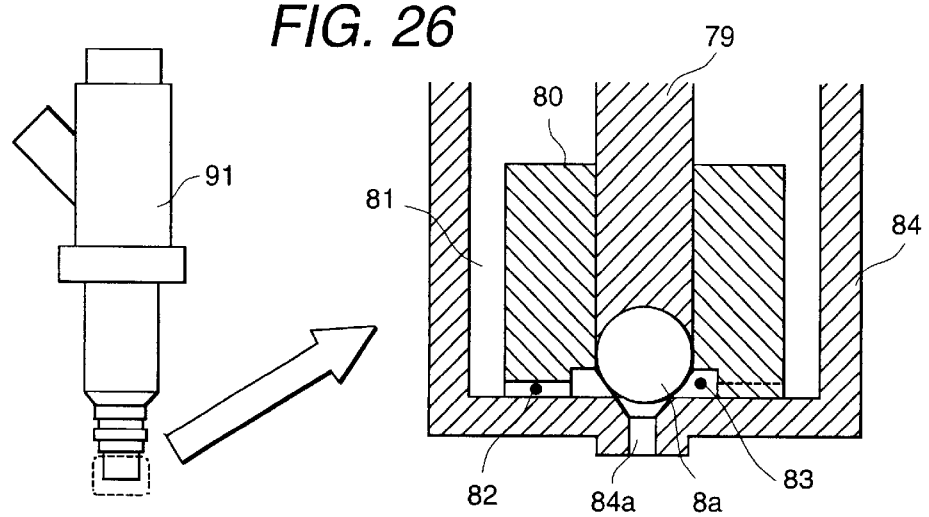
FIG. 26 is a view showing the nozzle structure of the strong penetration fuel injection valve shown in FIG. 25.

The spray form of the spray with initial spray which is one embodiment of the strong penetration injection valve is shown in FIG. 25 and FIG. 26. The fuel spray injected from the nozzle comprises the lead spray injected immediately after beginning of the injection, and spray 78 for ignition which follows to lead spray 77.

Nozzle 84 of strong penetration injection valve 91 is roughly composed of ball valve 8a, rod 79 connected to said ball valve, swirler 80 for giving the turn power the spray, injection port 84a installed in the nozzle portion, and initial spray adjusting groove 83 for adjusting the ratio of the lead sprays.

Although a partial section in the nozzle is shown in FIG. 26, the internal mechanism for controlling the lift amount of the rod by energizing to an electromagnetic coil is abbreviated here because it is similar to the prior art.

Next, the fuel saved beforehand is injected to initial spray adjusting groove 83 installed in the downstream by turn groove 82 immediately after ball valve 8a opens. Because the fuel flows to turn groove 82 via fuel passage 81, and the fuel injection is continued while receiving the turn power, spray 78 for ignition made fine particles is injected following lead spray 77.

The lead spray is distributed in the center part of the fuel spray as shown in FIG. 25, and this distribution ratio is set to about 3–10% in the radial distribution in the direction of injection.

The fuel spray travel can be adjusted according to the capacity of above-mentioned initial spray adjusting groove 83. The lead spray ratio increases, and the fuel spray travel expands by increasing the capacity.

The spray form and the configuration of the strong penetration injection valve according to another embodiment is explained hereinafter by using FIG. 27 and FIG. 28.

Figure 27:
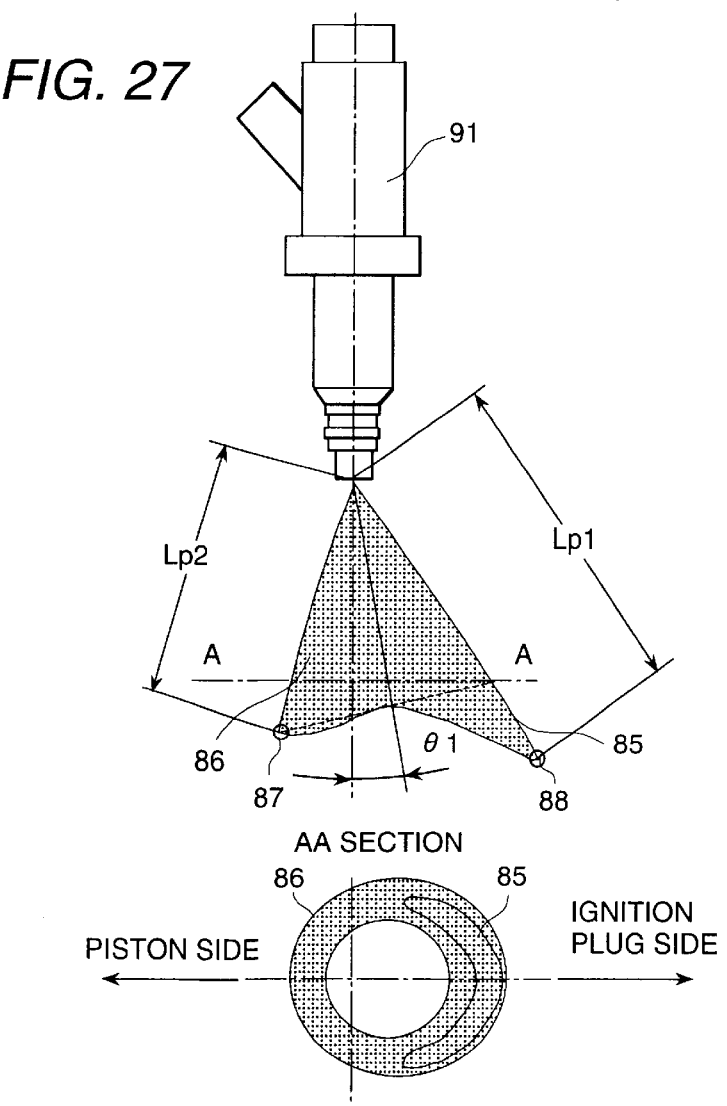
FIG. 27 is a view showing the spray form of the deflection spray.
Figure 28:
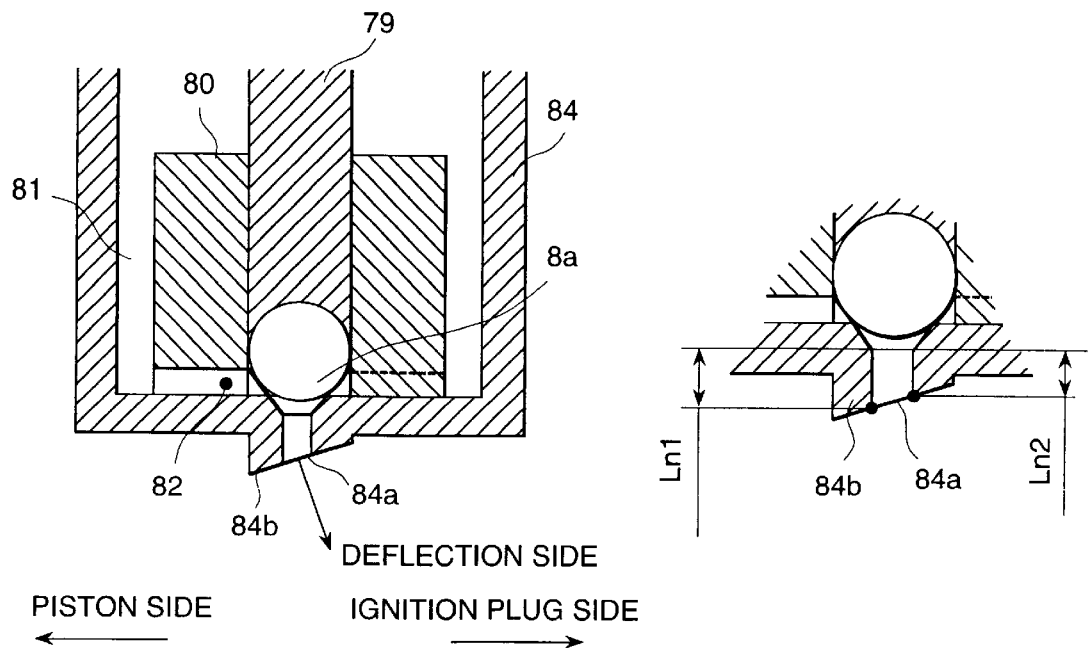
FIG. 28 is a view showing the nozzle structure of the strong penetration fuel injection valve shown in FIG. 27.

FIGS. 27 shows the embodiment in which the spray form is assumed to be deflection spray. The fuel spray injected from strong penetration injection valve 91 is composed of lead spray 85 injected aiming at the sparking plug, and spray 86 for ignition injected aiming at the piston side.

On the lead spray side, the fuel spray travel is long. Here, Lp1 is the length of the ridge line formed by the lead spray side, and Lp2 is the length of the ridge line formed by the spray for ignition side.

Moreover, θ1 is the degree of the deflection angle, and showing the swinging angle from a center axis of the strong penetration injection valve in the direction of the fuel injection.

End face 84b of injection port 84a installed in nozzle 84 is inclined in the direction of a center axis of the strong penetration injection valve as shown in FIG. 16.

Therefore, the distance from the sheet part of ball valve 8a to nozzle end face 84b is different. Here, it is easy for the turn energy of the turn power given by turn groove 82 to be preserved, because Ln2 is shorter in distance Ln1 and Ln2 of the injection port.

Therefore, the fuel injected from the Ln2 side of nozzle end face 84b forms the spray form which inclines to the Ln2 side being made to fine particles by shear force with atmosphere. Because spray penetration increases by the ratio of Lp1/Lp2 large, the fuel spray travel becomes long. The ratio of Lp1/Lp2 is set to about 1.2.

Figure 29:
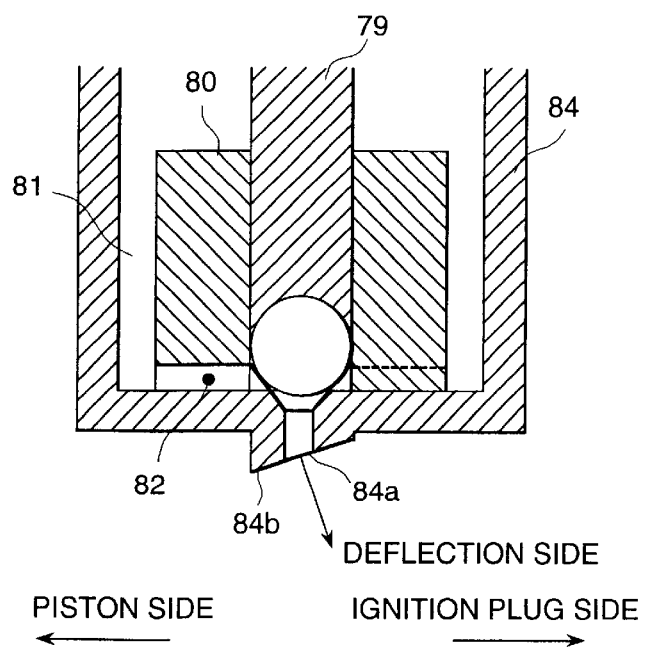
FIG. 29 is a view showing the nozzle structure of a different strong penetration fuel injection valve shown in FIG. 27.

FIG. 29 shows one embodiment of another nozzle in which injection port 84a inclines in the direction of a center axis of the strong penetration injection valve.

Figure 30:
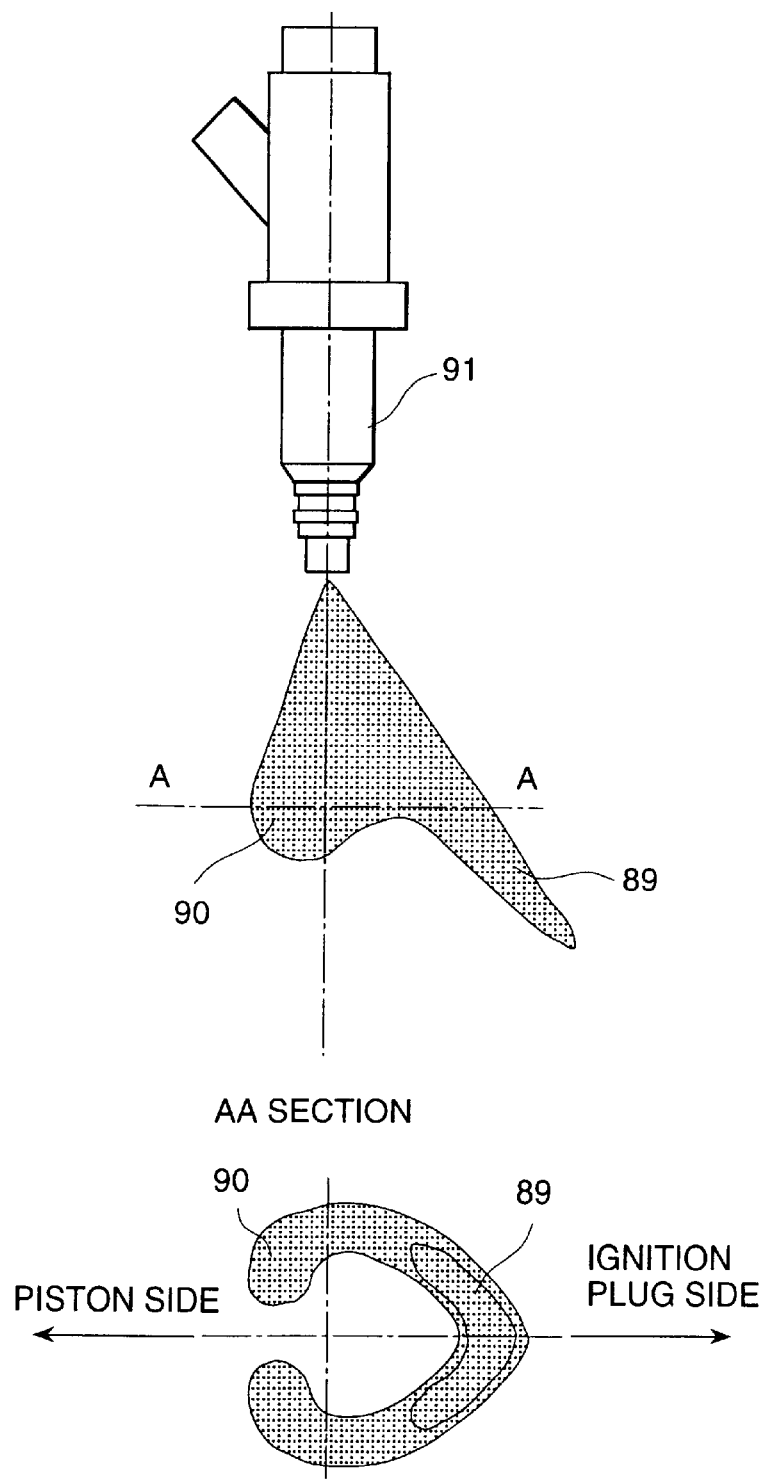
FIG. 30 is a view showing the spray form of the lead spray.
Figure 31:
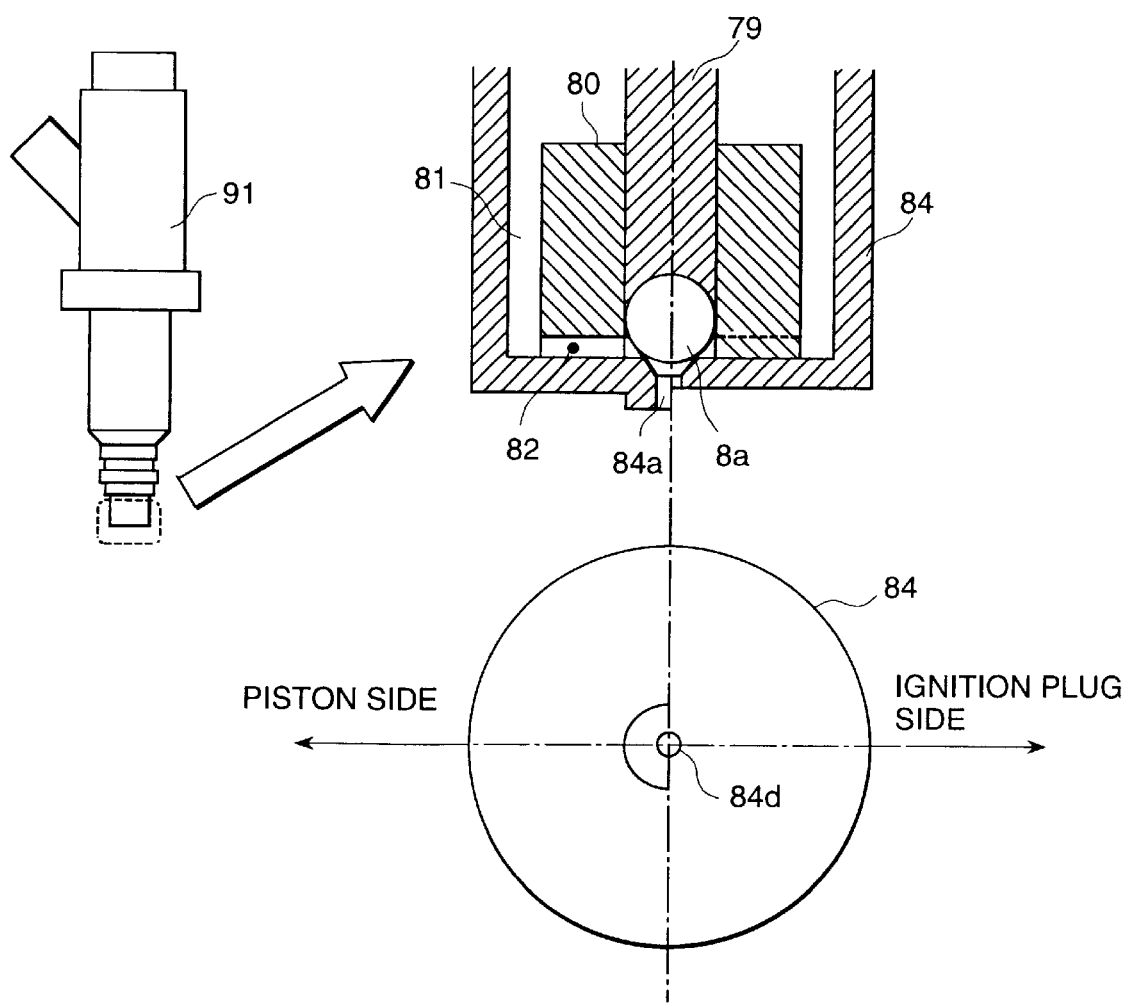
FIG. 31 is a view showing the nozzle structure of the strong penetration fuel injection valve shown in FIG. 30.

Next, the configuration and the fuel spray form of the strong penetration injection valve according to another embodiment is explained by using FIG. 30 and FIG. 31. The fuel spray injected from strong penetration injection valve 91 is composed of lead spray 89 injected aiming at the sparking plug, and spray 90 for ignition injected aiming at the piston side.

This spray form is lead spray. The spray on the opposite side of the lead spray has the form with a part of space as shown in the AA sectional view.

Moreover, the density of the flow of lead spray 89 turned to the sparking plug increases more than that of spray 90 for ignition. Therefore, the fuel spray travel of lead spray 89 becomes longer than that of spray 90 for ignition.

The section in the nozzle where this lead spray is generated is shown in FIG. 31.

the cutting lack of inject 84d is set to the side of the sparking plug. In addition, the space is generated partially in the external of the spray by forming the nozzle end face like the shape cut to about half of the injection, and by using that the shear force between the injected fuel and the atmosphere is different in the circumferential direction.

Therefore, because spray penetration in the direction of the sparking plug increases, the fuel spray can be carried to the sparking plug, and the stable stratification drive becomes possible in the high supercharging and the high revolution.

What is claimed is:

1. An internal combustion engine comprising:
    a supercharging machine for pressurizing the air supplied to the combustion chamber,
    a fuel injection valve for injecting fuel to the air pressurized in said combustion chamber,
    a sparking plug for igniting a mixture of the air and the fuel mixed in said combustion chamber, and
    a fuel density control means for forming a mixture layer of a density of the fuel ignited easily at an ignition timing of said sparking plug around the sparking plug.

2. The internal combustion engine according to claim 1, wherein said fuel density control means includes a fuel injection valve which injects the necessary supply fuel in twice before the timing of the ignition of said sparking plug.

3. The internal combustion engine according to claim 1, wherein said fuel density control means includes a fuel injection valve, wherein the fuel injection valve gives the fuel spray in which cone spray is a basic spray form, and wherein said control means has a slit part where the density of the fuel is rough to balance the pressure in the inside and outside of spray.

4. The internal combustion engine according to claim 3, wherein said fuel injection valve injects the necessary supply fuel in twice before the timing of the ignition of said sparking plug.

5. The internal combustion engine according to claim 2 or 4, wherein the preceding first spray and the following second spray overlap at the position of said sparking plug at the timing of the ignition of said sparking plug.

6. The internal combustion engine according to any one of claims 1 to 4, wherein the ignition timing under supercharging is in a first stage of the compression process.

7. The internal combustion engine according to claim 2 or 4, wherein at least one of the spray allotment rate of the preceding first spray and the following second spray, an interval between both sprays, and the ignition timing of said sparking plugs is controlled by the operating state of engine.

8. The internal combustion engine according to claim 7, wherein at least one of the spray allotment rate of the preceding first spray and the following second spray, an interval between both sprays, and the ignition timing of said sparking plugs is controlled by the voltage of the battery.

9. An internal combustion engine comprising:
    a supercharging machine for pressurizing the air supplied to a combustion chamber,
    a fuel injection valve for injecting fuel to the air pressurized in said combustion chamber,
    a sparking plug for igniting a mixture of the air and the fuel mixed in said combustion chamber,
    a fuel density control means for forming a mixture layer of a density of the fuel ignited easily at an ignition timing of said sparking plug around the sparking plug,
    a turbo charger for driving said supercharging machine, which is rotated by an exhaust stream from said combustion chamber,
    a catalyst device for purifying harmful components in the exhaust stream from said combustion chamber, and
    a regulating valve for sending the exhaust to said catalyst device by bypassing said turbo charger when the internal combustion engine starts.

10. The internal combustion engine according to claim 9, wherein the time of turbo charger bypass control by said regulating valve can be adjusted by any one of the temperature of the engine cooling water, the temperature of the exhaust, and timers started at a starting point.

\* \* \* \* \*